(12) United States Patent
Takahashi et al.

(10) Patent No.: US 8,608,123 B2
(45) Date of Patent: Dec. 17, 2013

(54) STAND DEVICE FOR PORTABLE ELECTRONIC DEVICE

(75) Inventors: Nobuyuki Takahashi, Tokyo (JP); Nobuyoshi Ishiwata, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 82 days.

(21) Appl. No.: 13/201,959

(22) PCT Filed: Dec. 25, 2009

(86) PCT No.: PCT/JP2009/071602
§ 371 (c)(1),
(2), (4) Date: Sep. 20, 2011

(87) PCT Pub. No.: WO2010/095339
PCT Pub. Date: Aug. 26, 2010

(65) Prior Publication Data
US 2012/0001048 A1    Jan. 5, 2012

(30) Foreign Application Priority Data

Feb. 23, 2009  (JP) ................................ 2009-040013

(51) Int. Cl.
  *A47B 91/00*   (2006.01)
  *A47G 29/00*   (2006.01)
  *B65D 19/00*   (2006.01)
  *H05K 5/00*    (2006.01)
  *G06F 1/16*    (2006.01)
  *H05K 7/00*    (2006.01)

(52) U.S. Cl.
  USPC ............ 248/346.03; 248/346.01; 361/679.01; 361/679.41; 361/679.38; 361/754; 361/798

(58) Field of Classification Search
  USPC .................. 248/346.03, 346.01; 361/679.01, 361/679.41, 679.38, 754, 798
  See application file for complete search history.

(56) References Cited

U.S. PATENT DOCUMENTS 7,079,385 B1 *   7/2006   Cheng et al. ............. 361/679.57
7,142,421 B2 *   11/2006  Cheng et al. ............. 361/679.57
2008/0239658 A1* 10/2008  Chou et al. .................... 361/686

FOREIGN PATENT DOCUMENTS

JP    7296859 A     11/1995
JP    10255855 A    9/1998

(Continued)

OTHER PUBLICATIONS

International Search Report for corresponding Application PCT/JP2009/071602, dated Feb. 16, 2010.

(Continued)

*Primary Examiner* — Terrell McKinnon
*Assistant Examiner* — Christopher Garft
(74) *Attorney, Agent, or Firm* — Matthew B. Dernier, Esq.; Gibson & Dernier LLP

(57) ABSTRACT

To provide a stand device capable of improving workability in removing a portable electronic device. A stand device has a pedestal and a lever mechanism. The pedestal is supported movable between a support portion for supporting an electronic device mounted on the support surface and a removal position at which the pedestal is arranged through a movement thereof in which the pressing portion descends. The lever mechanism includes a pressed arm and a projection. The pressed arm is pressed by the pressing portion to thus move downward when the pedestal moves from the support position to the removal position. The projection moves upward along with the rotation of the fulcrum portion caused by the downward movement of the pressed arm to thus project from the support surface of the pedestal.

7 Claims, 16 Drawing Sheets

(56) References Cited

FOREIGN PATENT DOCUMENTS

| | | |
|---|---|---|
| JP | 2004335371 A | 11/2004 |
| JP | 3731836 B2 | 1/2006 |
| JP | 2007096883 A | 4/2007 |
| JP | 4190344 B2 | 12/2008 |
| JP | 2009200799 A | 9/2009 |

OTHER PUBLICATIONS

International Preliminary Report on Patentability for corresponding Application PCT/JP2009/071602, dated Sep. 13, 2011.

Office Action for corresponding Chinese Patent Application No. 200980158878.5, dated Jun. 3, 2013.

* cited by examiner

FIG.12
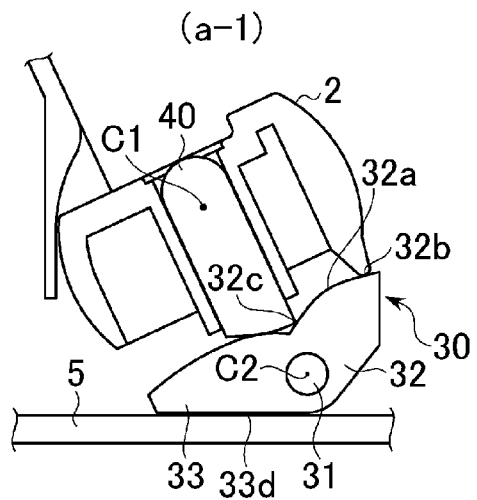
(a-1)
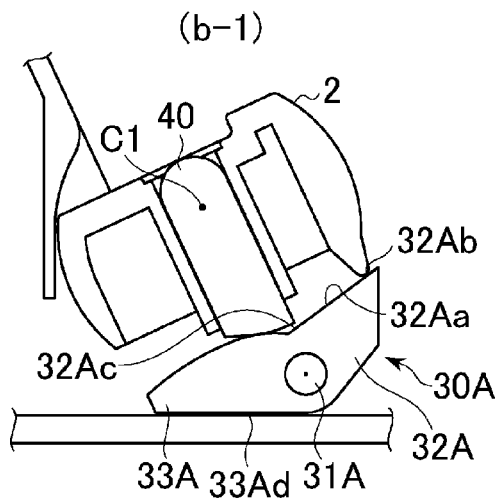
(b-1)
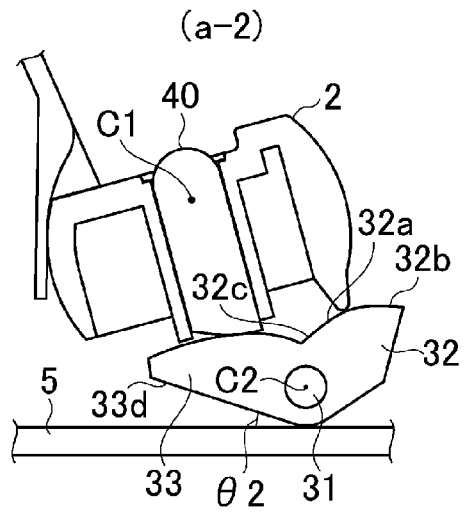
(a-2)
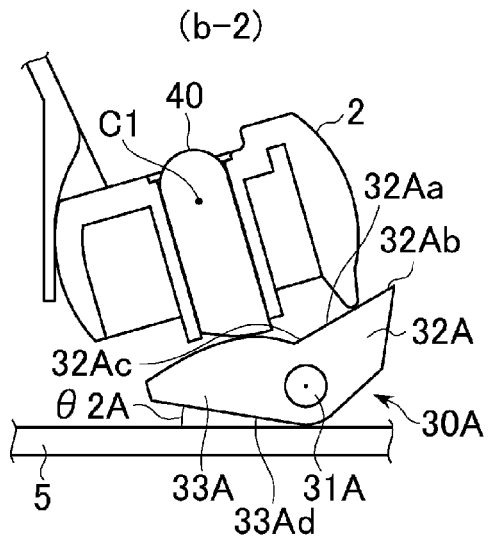
(b-2)
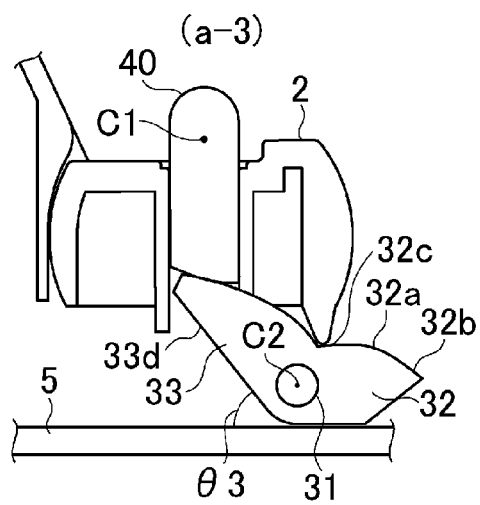
(a-3)
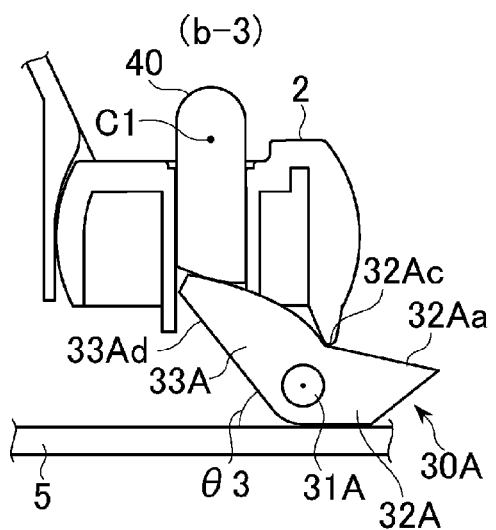
(b-3)

FIG.16
(a)
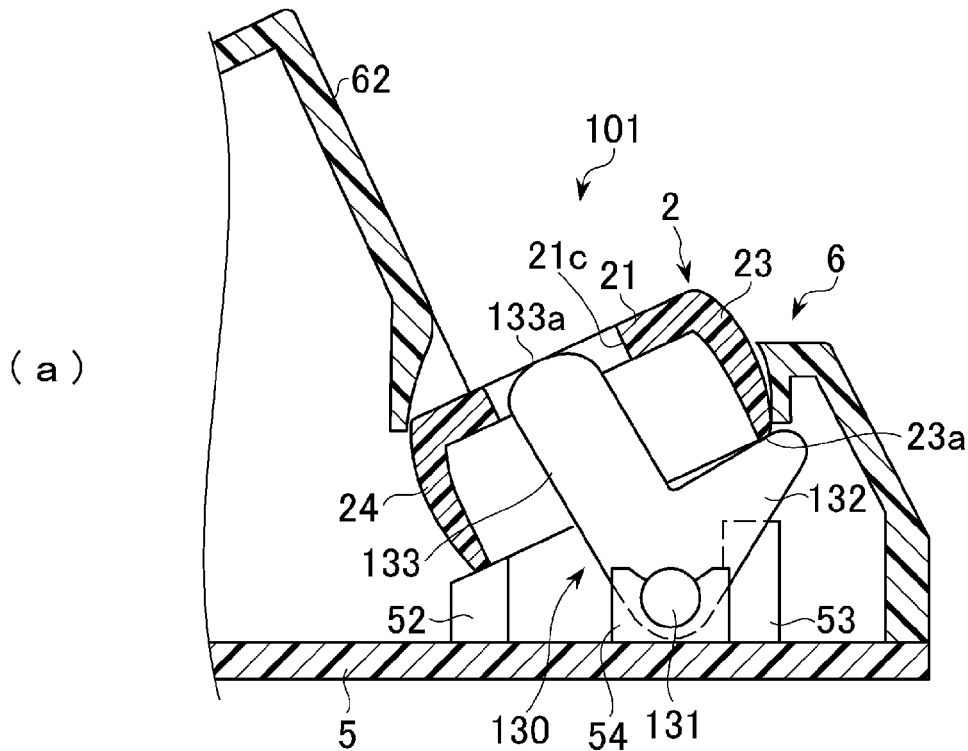
(b)
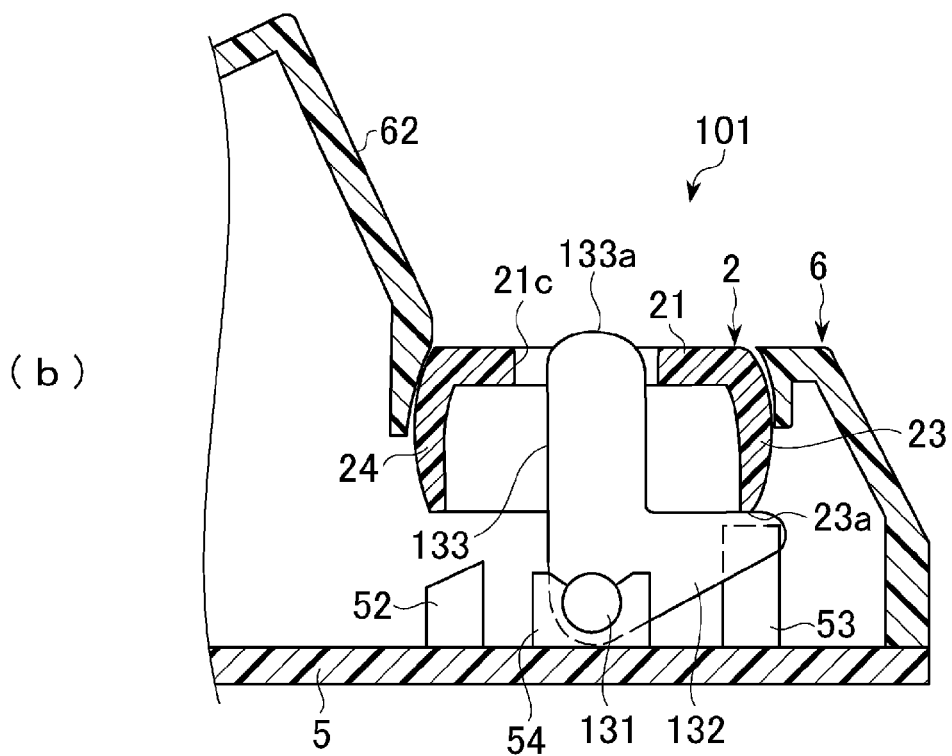

STAND DEVICE FOR PORTABLE ELECTRONIC DEVICE

TECHNICAL FIELD

The present invention relates to a stand device for supporting and charging, and so forth, a portable electronic device, such as a portable phone, a portable game device, a camera, and so forth, and in particular to a technique for improving workability in removing an electronic device from a stand device.

SUMMARY OF THE INVENTION

Background Art

Conventionally, stand devices for standing a portable electronic device, such as a portable phone, a portable game device, and so forth, and electrically connecting to the electronic device have been used (e.g., Patent Document 1). Such a stand device has, on the top surface thereof, a connector for connecting to a connector of an electronic device. Electric charge for the electronic device and data exchange between the electronic device and a peripheral device connected to the stand device are performed through the connector.

PRIOR ART DOCUMENT

Patent Document

Patent Document 1: Japanese Patent Laid-open Publication No. 2007-96883

According to a conventional stand device, there may be a case in which an electronic device cannot be readily removed from the stand device. For example, when the connector of a stand device remains rigidly inserted into the connector of an electronic device, the electronic device is not readily separated from the stand device. In such a case, for example, a user needs to lift the electronic device on one hand while holding the stand device on the other hand, which makes smooth removal difficult.

The present invention has been conceived in view of the above, and an object thereof is to provide a stand device for improving workability in removing a portable electronic device.

In order to solve the above described problem, a stand device according to the present invention comprises a pedestal having a support surface on which the portable electronic device can be mounted and a lever mechanism arranged below the pedestal. The pedestal includes a pressing portion for pressing the lever mechanism, and is supported movable between a first position for supporting the electronic device mounted on the support surface and a second position at which the pedestal is arranged through a movement thereof in which the pressing portion descends. The lever mechanism includes a pressed portion, a fulcrum portion, and a projection. The pressed portion is positioned below the pressing portion and moves downward by being pressed by the pressing portion when the pedestal moves from the first position to the second position. The fulcrum portion is rotatably supported and rotates along with the movement of the pressed portion. The projection is movable up, and down along with the rotation of the fulcrum portion and moves upward along with the rotation of the fulcrum portion caused by the downward movement of the pressed portion to thus project upward from the support surface of the pedestal.

According to the present invention, in removing an electronic device from a stand device, the projection presses up the electronic device, so that workability in removing can be improved. Even when, e.g., the connector of the stand device remains rigidly inserted into the connector of the electronic device, these connectors can be readily separated from each other, and the electronic device can be readily removed from the stand device.

According to one aspect of the present invention, the pressing portion may be provided on a front side of the pedestal, and the pedestal may move such that the front side thereof descends to be thereby put into the second position.

According to this aspect, by moving the pedestal from the first position to the second position, it is possible to incline forward the electronic device that is supported by the pedestal at the first position. As a result, workability in removing can be further improved.

Further, according to this aspect, the stand device may further comprise a connector projecting upward from the support surface and supported so as to incline forward. With this arrangement, a user of the stand device can remove the electronic device from the stand device by lifting the electronic device diagonally forward. This can further improve the workability in removing.

Further, according to another aspect of the present invention, the lever mechanism may include a slider movable up and down and including the projection at an upper portion thereof. Further, the lever mechanism may include a lever including the fulcrum portion, the pressed portion, and a support portion for supporting the slider on a lower side of the slider and moving upward along with the rotation of the fulcrum portion to thereby press up the slider. The stand device may further include a guide portion for guiding a moving direction of the slider.

According to this aspect, the electronic device can be pressed upward in a direction in which the guide portion guides the slider to move.

Further, according to this aspect, the guide portion may be provided to the pedestal. With this arrangement, a constant moving direction of the slider relative to the pedestal can be ensured.

Further, according to this aspect, the pedestal may be provided with a connector projecting from the support surface, and the guide portion may guide the slider to move in a direction in which the connector projects. With this arrangement, in removing the electronic device from the stand device, the connector of the electronic device can be smoothly separated from the connector of the stand device.

Further, according to this aspect, the support portion may be formed extending in a radial direction of the fulcrum portion, and the slider may include a contact portion for contacting on the support portion. Further, the guide portion may support the slider such that the contact portion moves on the support portion toward a distal end of the support portion while the support portion moves upward around the fulcrum portion. A movement amount of the slider relative to the turn degree of the lever is larger when the support portion presses up the sliding remember at a position closer to the distal end, compared to a case in which the support portion presses up the slider at a position closer to the fulcrum portion. Therefore, according to a structure in which the contact portion moves on the support portion toward the distal end, a longer movement distance can be ensured for the slider, compared to a structure in which the support portion presses up the slider only at a position closer to the fulcrum portion.

BRIEF DESCRIPTION OF THE DRAWINGS

FIG. 12 is a diagram for explaining movement of the lever, in which FIG. 12(a-1) to FIG. 12(a-3) show the lever and the pedestal and FIG. 12(b-1) to FIG. 12(b-3) show a lever for comparison and the pedestal;

FIG. 16 is a cross sectional view of a stand device according to another embodiment of the present invention, in which FIG. 16(a) shows the stand device with the pedestal at the support position and FIG. 16(b) shows the stand device with the pedestal at the removal position.

DETAILED DESCRIPTION OF THE PREFERRED EMBODIMENTS

Figure 1:
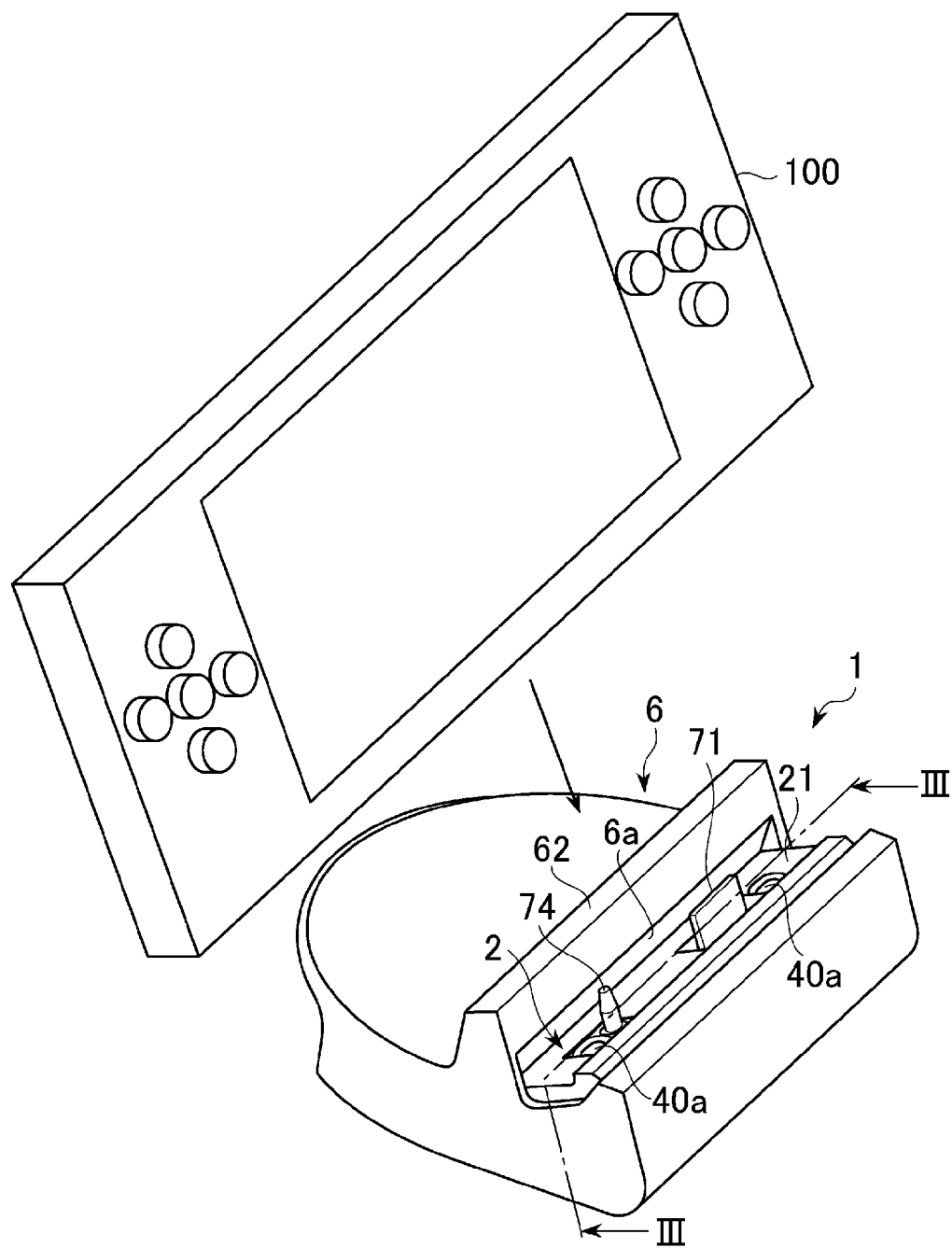
FIG. 1 is a perspective view of a stand device according to an embodiment of the present invention.
Figure 2:
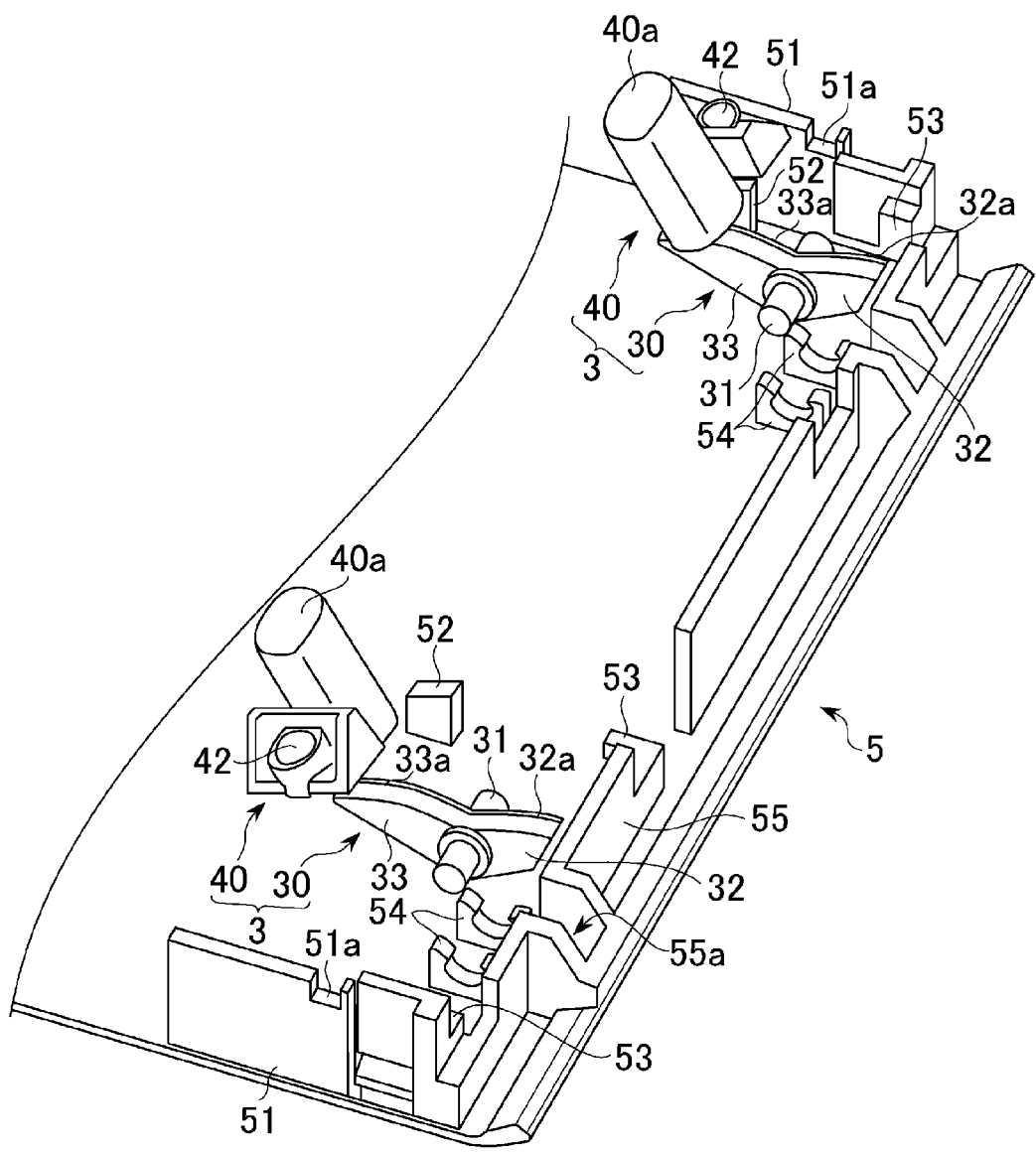
FIG. 2 is an exploded perspective view of a lever mechanism and a base plate of the stand device.
Figure 3:
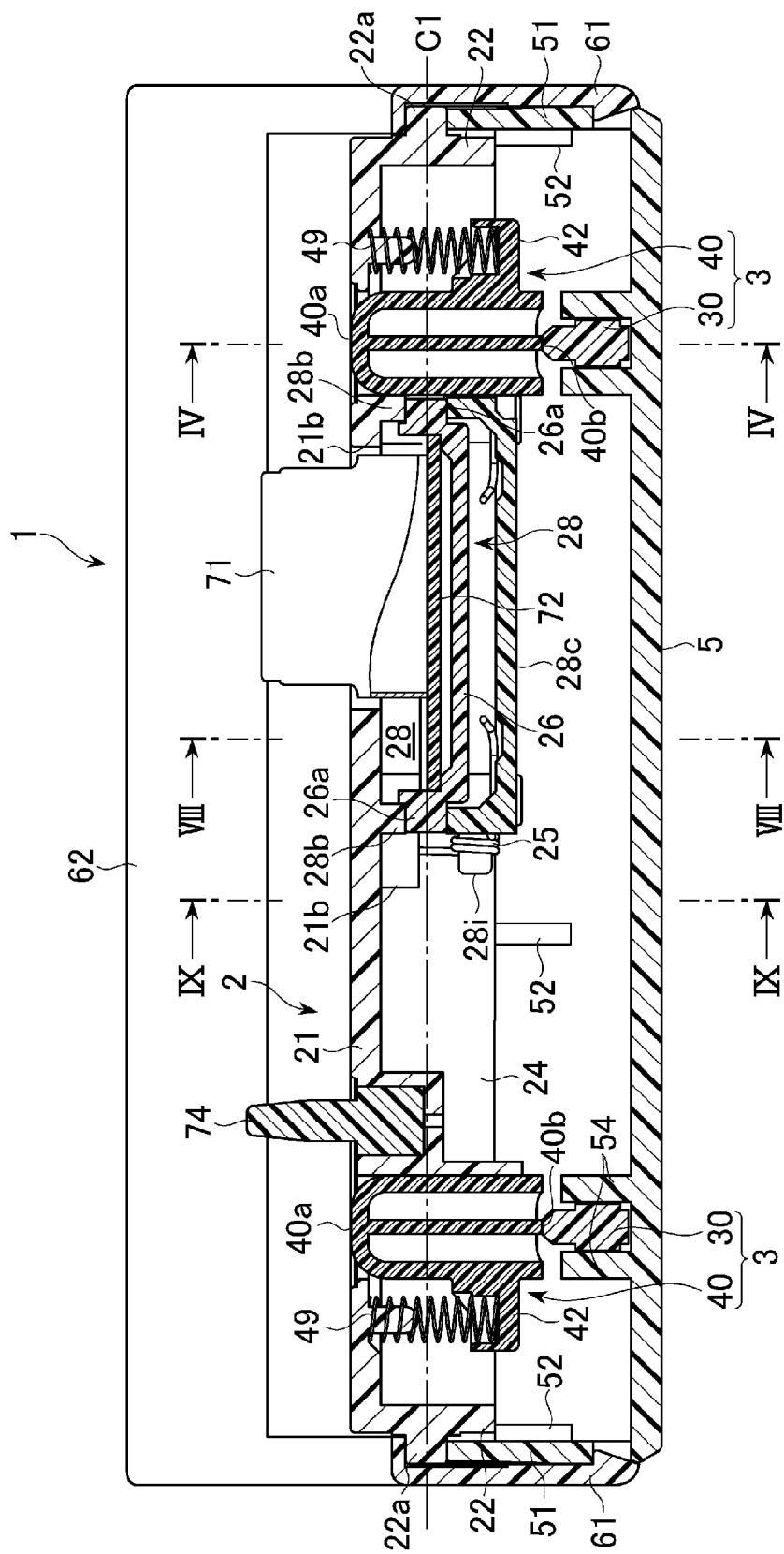
FIG. 3 is a cross sectional view along the line III-III shown in FIG. 1, obtained by cutting the stand device along a cross section perpendicular to the support surface of the pedestal.
Figure 4:
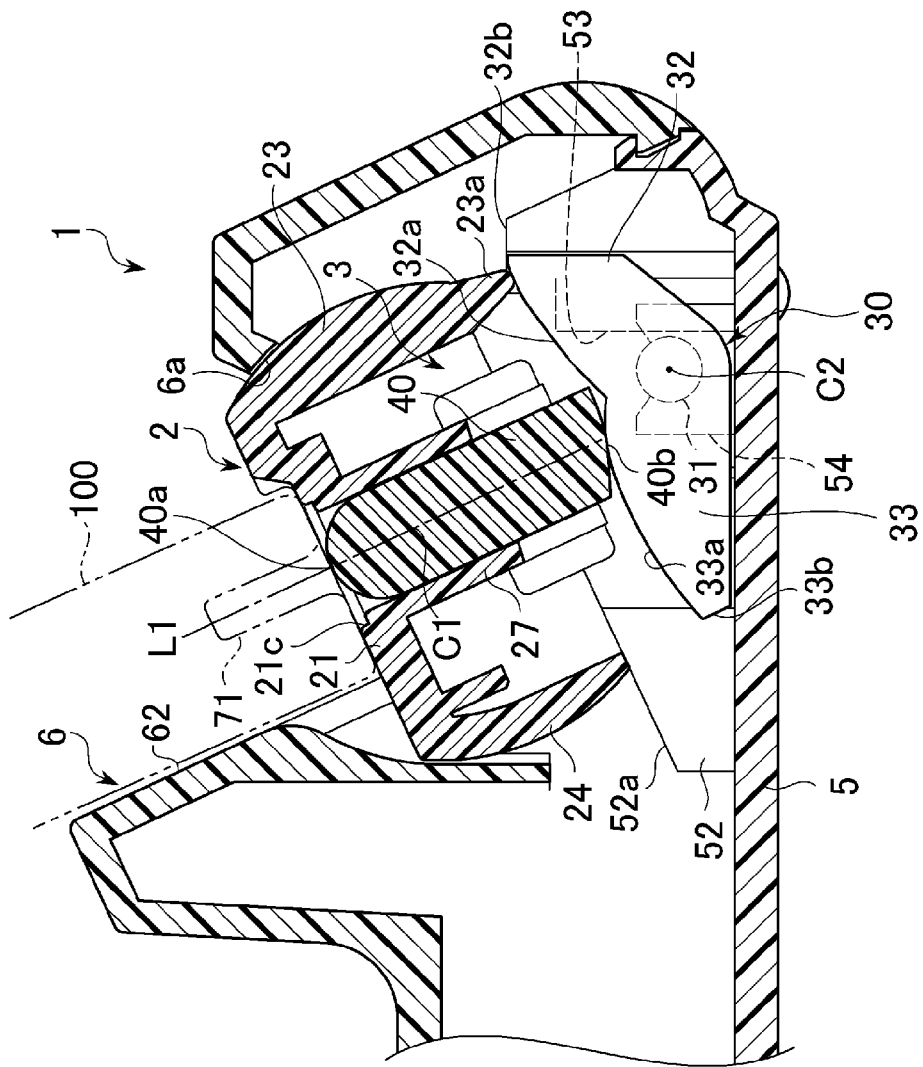
FIG. 4 is a cross sectional view along the line IV-IV shown in FIG. 3.
Figure 5:
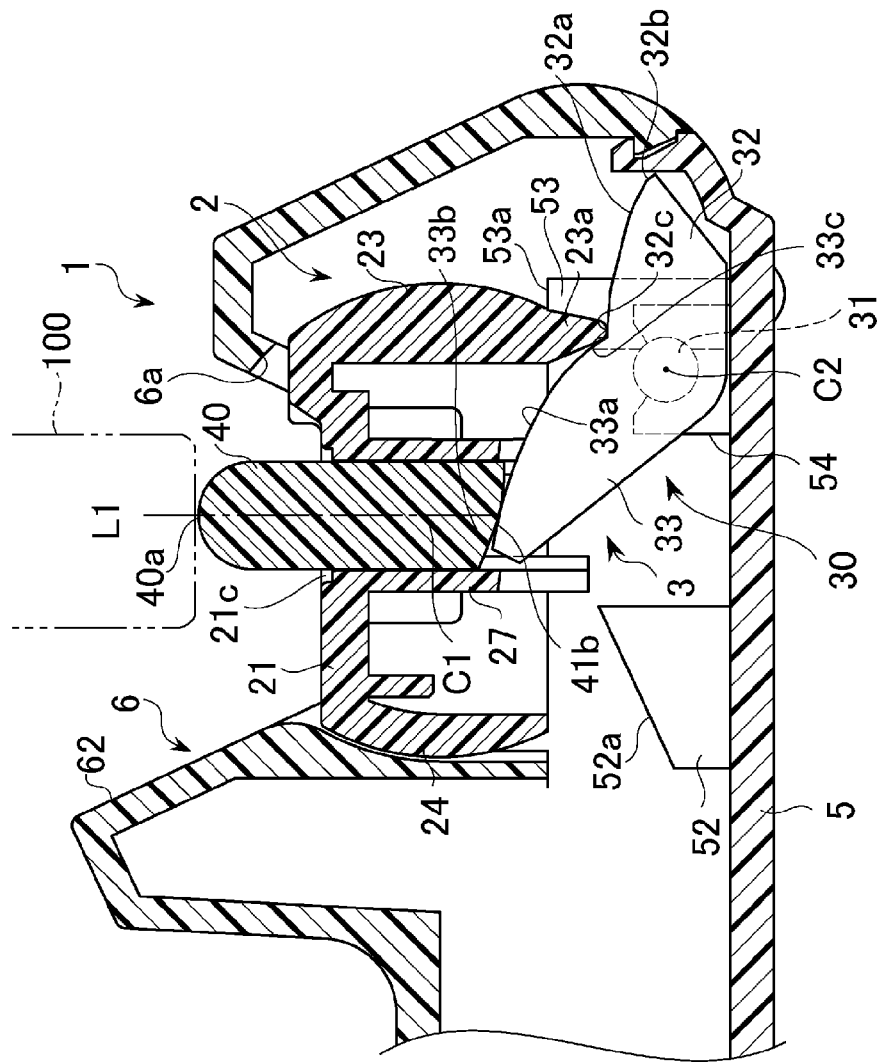
FIG. 5 is a cross sectional view obtained by cutting the stand device along the same cross section as that in FIG. 4, showing the pedestal of the stand device having turned from the position shown in FIG. 4.
Figure 6:
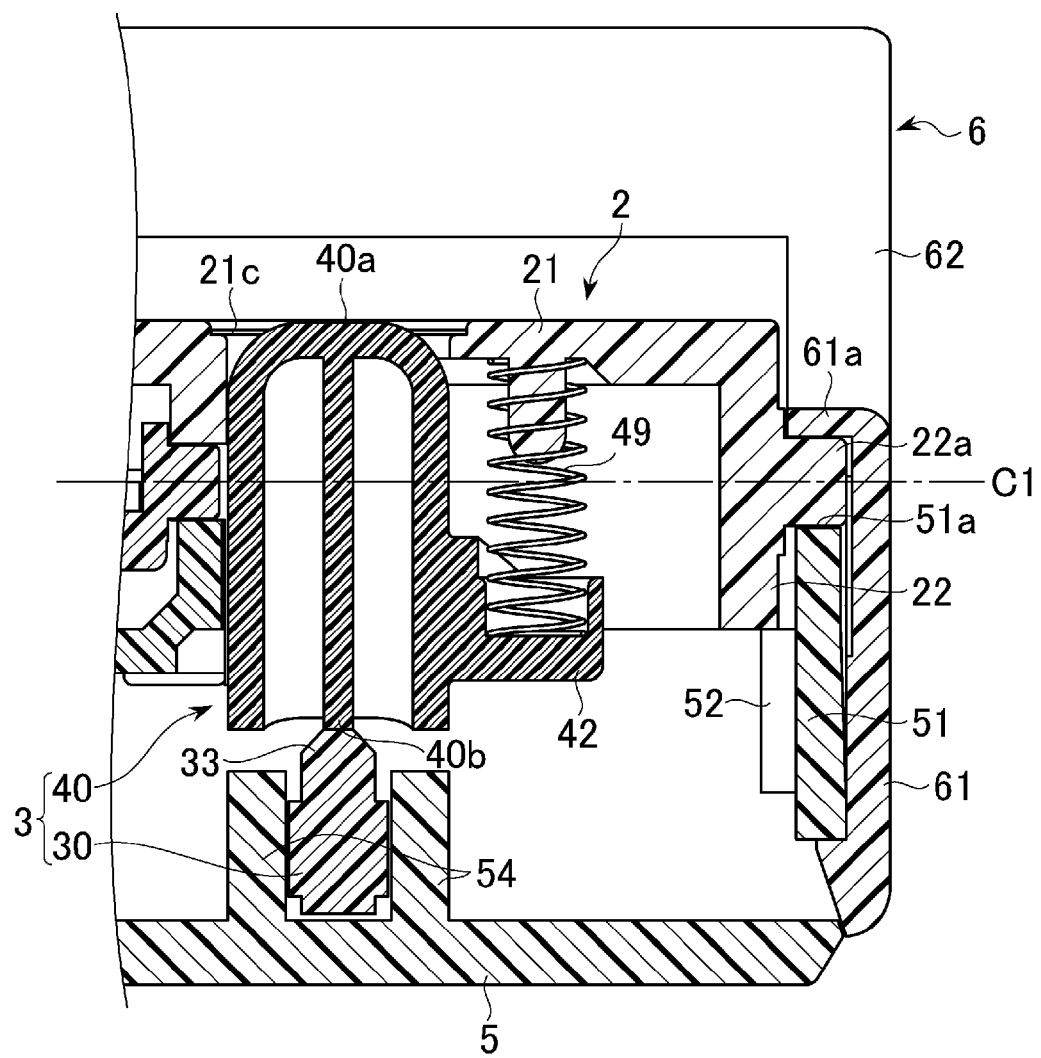
FIG. 6 is an enlarged diagram of FIG. 3, showing the lever mechanism mainly.
Figure 7:
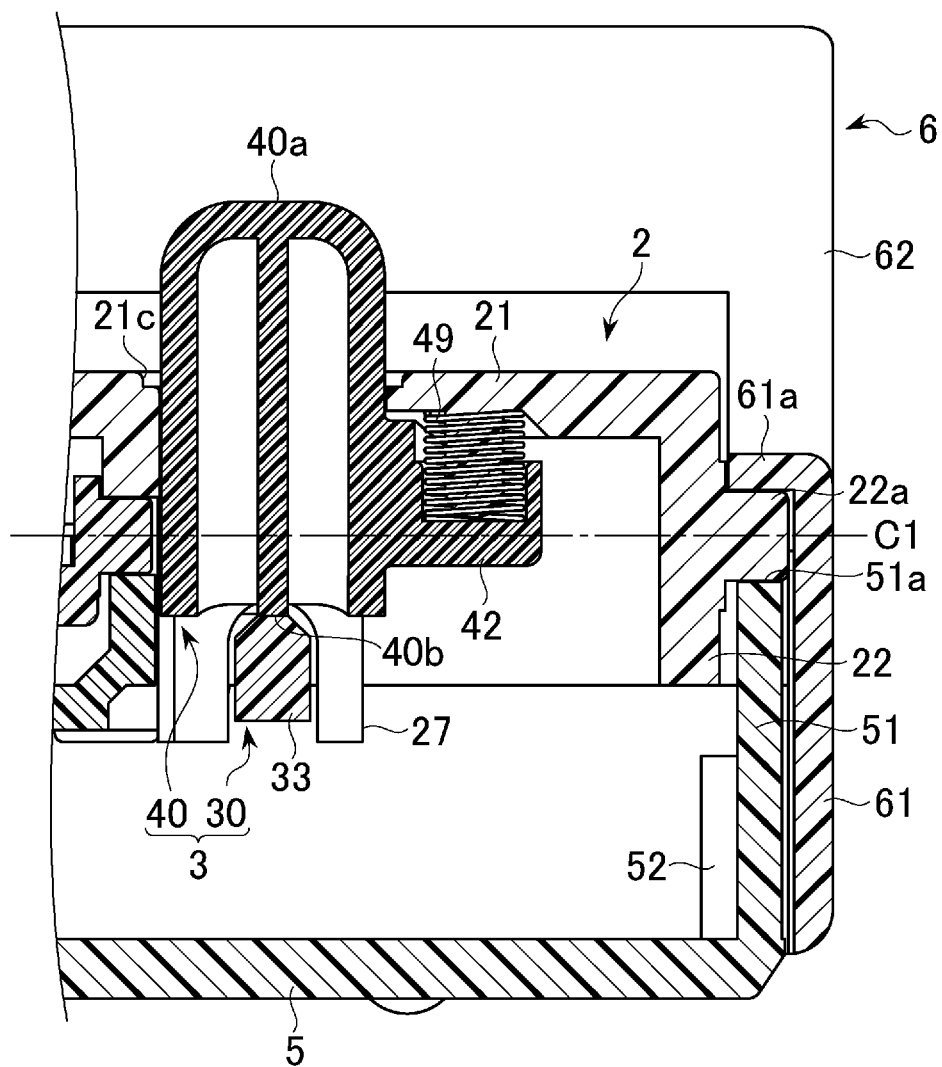
FIG. 7 is a cross sectional view of the stand device, showing the pedestal having turned from the position shown in FIG. 6.
Figure 8:
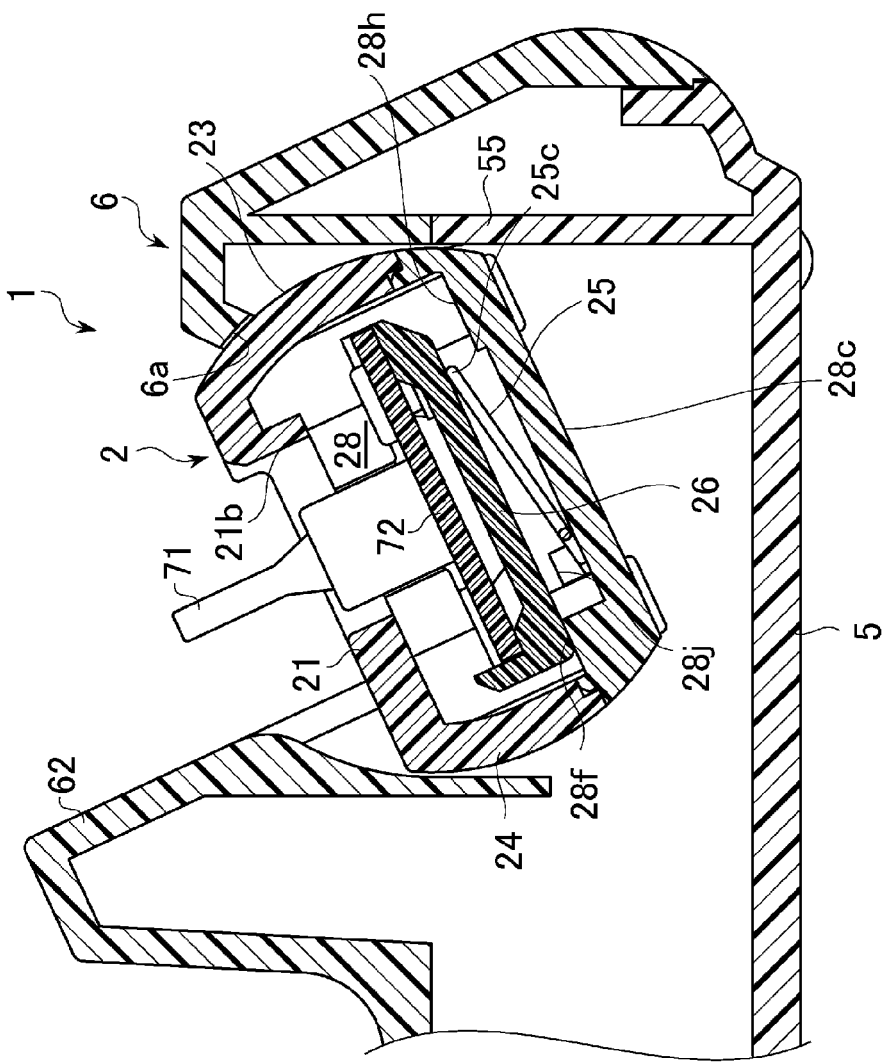
FIG. 8 is a cross sectional view along the line VIII-VIII shown in FIG. 3.
Figure 9:
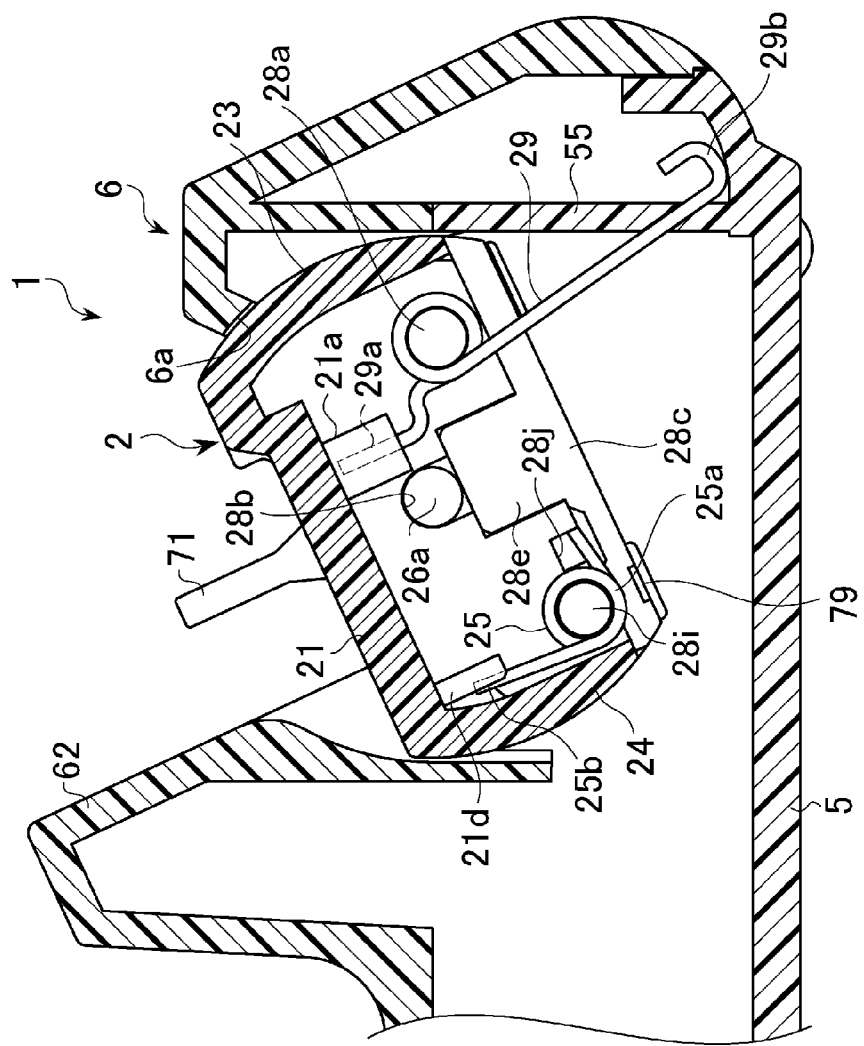
FIG. 9 is a cross sectional view along the line IX-IX shown in FIG. 3.
Figure 10:
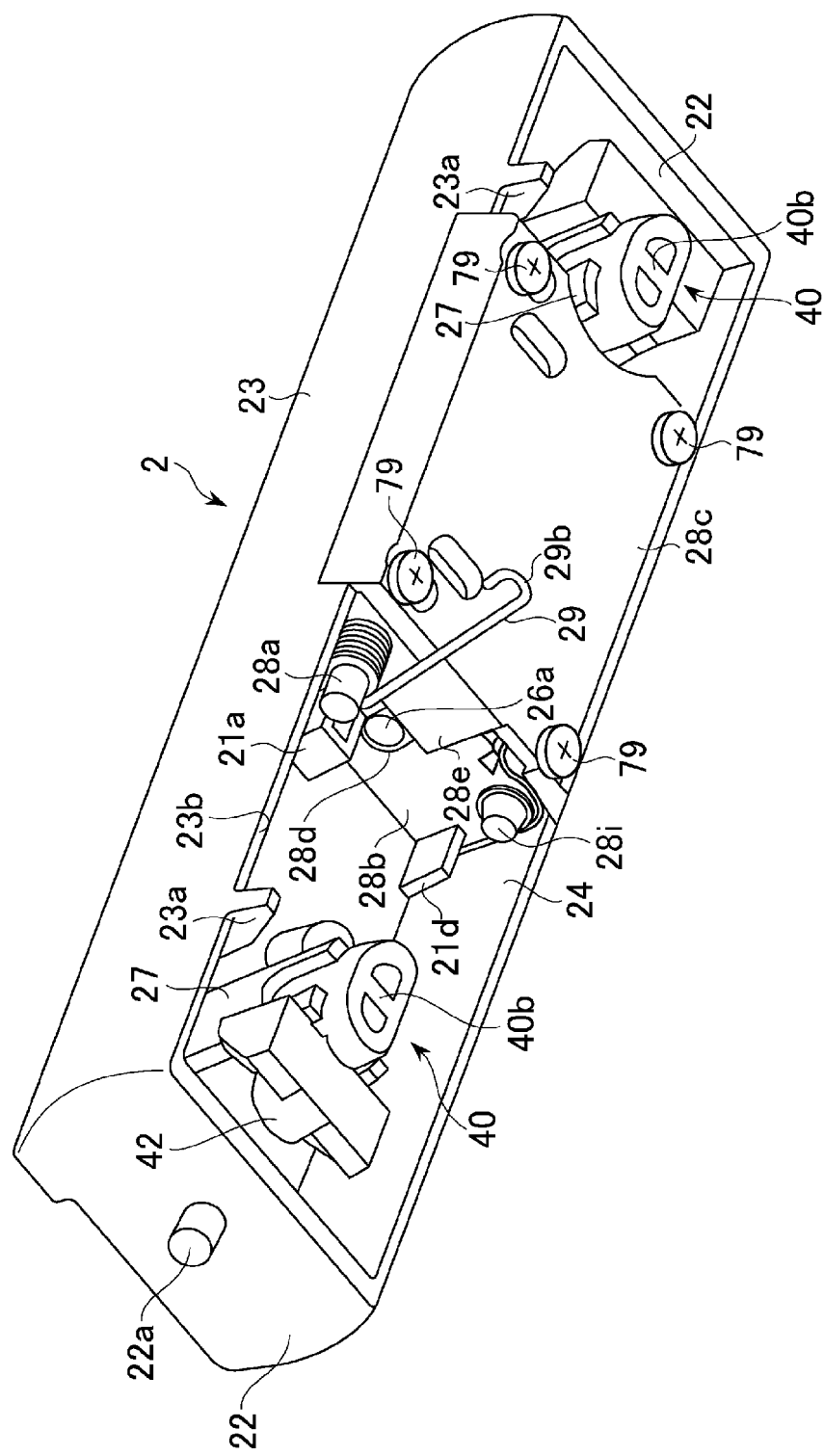
FIG. 10 is a perspective view of the pedestal viewed from diagonally below thereof.

In the following, one embodiment of the present invention will be described with reference to the accompanying drawings. FIG. 1 is a perspective view of a stand device 1, which is an example of an embodiment of the present invention. FIG. 2 is an exploded perspective view of a lever mechanism 3 and a base plate 5 provided in the stand device 1. FIG. 3 is a cross sectional view along the line III-III shown in FIG. 1 obtained by cutting the stand device 1 along a cross section perpendicular to the support surface portion 21 of the pedestal 2. FIG. 4 is a cross sectional view along the line IV-IV shown in FIG. 3. FIG. 5 is across sectional view obtained by cutting the stand device 1 along the cross section same as that in the cross sectional view of FIG. 4, showing the pedestal 2 of the stand device 1 having turned from the position shown in FIG. 4. FIG. 6 is an enlarged diagram of FIG. 3, showing the lever mechanism 3. FIG. 7 is a cross sectional view of the stand device 1, showing the pedestal 2 having turned from the position shown in FIG. 6. FIG. 8 is across sectional view along the line VIII-VIII shown in FIG. 3. FIG. 9 is a cross sectional view along the line IX-IX shown in FIG. 3. FIG. 10 is a perspective view obtained by viewing the pedestal 2 from diagonally below thereof.

As shown in FIG. 1 or FIG. 2, the stand device 1 is a device for standing an electronic device 100 upright, such as a portable phone, a portable game device, and so forth, and includes a pedestal 2 on which the electronic device 100 can be mounted. Further, the stand device 1 includes a plurality of lever mechanisms 3 placed below the pedestal 2. Each of the lever mechanism 3 includes a slider 40 movable in the up-down direction relative to the pedestal 2 and a lever 30 for moving up and down the slider 40. In this example, the stand device 1 includes two lever mechanisms 3 placed apart from each other in the left-right direction. Still further, the stand device 1 includes a base plate 5 for supporting the lever mechanism 3 and a housing 6 covering the base plate 5 from above thereof so that the lever mechanism 3 is accommodated inside.

As shown in FIGS. 3, 4 and 10, the pedestal 2 is a substantially box-shaped member that is open downward and elongated in the left-right direction. The pedestal 2 has a support surface portion 21 forming the top surface thereof, on which an electronic device 100 can be mounted. Further, the pedestal 2 includes paired lateral walls 22, 22, a front wall 23, and a rear wall 24, wherein the lateral walls 22, the front wall 23, and the rear wall 24 extend downward from the respective edges of the support surface portion 21. The housing 6 covering the base plate 5 has an opening 6a formed thereon, which is elongated in the left-right direction and has a shape corresponding to that of the pedestal 2. The pedestal 2 is placed inside the opening 6a such that the support surface portion 21 is exposed through the opening 6a.

The pedestal 2 includes a plurality of pressing portions 23a for pressing downward the lever mechanism 3. The pressing portion 23a is formed on the front side of the pedestal 2. In this example, the pressing portion 23a is formed on the lower edge 23b of the front wall 23 and projects downward (see FIG. 10). In this regard, as described above, the lever mechanisms 3 are positioned at two positions distant from each other in the left and right direction. The pressing portions 23a as well are provided at two distant positions on the lower edge 23b of the front wall 23.

The pedestal 2 is movable between a support position (the position of the pedestal 2 shown in FIG. 4) at which the pedestal 2 is arranged for supporting the electronic device 100 mounted on the support surface portion 21 and a removal position (the position of the pedestal 2 shown in FIG. 5) at which the pedestal 2 is arranged through a movement thereof in which the pressing portions 23 descend. In this example, the pedestal 2 is supported such that the position of the front side thereof is movable in the up-down direction. The pedestal 2 is put into the removal position through the movement in which the position of the front side thereof descends from the support position shown in FIG. 4.

In detail, as shown in FIG. 3 or FIG. 10, the lateral wall 22 has a pivot 22a formed thereon, which projects in the left-right direction and is rotatably supported by the base plate 5 and the housing 6. In this example, paired left and right support walls 51 stand upright on the respective edges of the base plate 5, and the upper edge of the support wall 51 has a concave 51a formed thereon which has a depth corresponding to the outside diameter of the pivot 22a (see FIG. 2). The pivot 22a is placed inside the concave 51a. Further, the housing 6 includes a lateral wall 61 extending downward and arranged along the support wall 51. The lateral wall 61 has a support portion 61a formed thereon which faces the upper edge of the support wall 51 in the up-down direction. A concave is formed also at a position of the support portion 61a that is opposed to the concave 51a, so that the pivot 22a is placed between the concave of the support portion 61a and the concave 51a to be rotatably supported.

As shown in FIG. 4, at the support position, the pedestal 2 is supported diagonally such that the front side of the support surface portion 21 is positioned higher than the rear side thereof. Therefore, the pedestal 2 supports the electronic device 100 on a rearward slant. In this regard, the housing 6 includes a rear wall 62 standing diagonally on the rear side of the pedestal 2. The electronic device 100 is mounted on the support surface portion 21 while leaning on the rear wall 62.

The pivot 22a is positioned at the substantial center of the lateral wall 22. The pedestal 2 moves around the pivot 22a to be thereby put into the removal position. That is, the pedestal 2 turns such that the front side thereof descends while the rear side ascends to be thereby put into the removal position. As shown in FIG. 5, at the removal position, the pedestal 2 is arranged such that the support surface portion 21 remains horizontal relative to a plane where the stand device 1 is mounted. That is, at the removal position, the support surface portion 21 remains parallel to the base plate 5.

Note that a user of the stand device 1 can move the pedestal 2 from the support position to the removal position by moving the electronic device 100 mounted on the support surface portion 21. That is, in a state where the electronic device 100 is mounted on the support surface portion 21 of the pedestal 2, the support surface portion 21 is in contact with the lower surface of the electronic device 100. Further, the stand device 1 includes a connector 71 projecting upward from the support surface portion 21. The connector 71 is inserted into, and thereby connected to, a connector (not shown) formed on the lower surface of the electronic device 100. Therefore, when a user inclines forward the electric device 100 mounted on the support surface portion 21, the pedestal 2 accordingly moves around the pivot 22a such that the front side thereof descends.

As shown in FIG. 4, a rear stopper 52 is formed on the base plate 5. The rear stopper 52 has a wall-shape standing upward from the base plate 5, and contacts on the pedestal 2 arranged at the support position. When the pedestal 2 turns from the removal position to the support position, the top surface 52a of the rear stopper 52 hits on the lower edge of the pedestal 2 to thereby restrict a turn of the pedestal 2 beyond the support position. In this example, three rear stoppers 52 are formed on the base plate 5 apart from one another in the left-right direction (see FIG. 3). Further, the top surface 52a is formed beveled such that the front edge thereof is positioned higher than the rear edge. When the pedestal 2 is arranged at the support position, the top surfaces 52a of the left and right rear stoppers 52 are positioned along the lower edge of the lateral wall 22.

Further, as shown in FIG. 5, a front stopper 53 is formed on the base plate 5. The front stopper 53 has a wall-shape standing upright on the base plate 5, and contacts on the pedestal 2 at the removal position. When the pedestal 2 turns from the support position to the removal position, the top surface 53a of the front stopper 53 hits on the lower edge of the pedestal 2 to thereby restrict a turn of the pedestal 2 beyond the removal position. In this example, similar to the rear stopper 52, three front stoppers 53 are formed apart from one another in the left-right direction (see FIG. 2). The respective front stoppers 53 are positioned in front of the rear stoppers 52. The top surface 53a of the front stopper 53 is positioned in parallel to the base plate 5, and are positioned along the lower edge of the lateral wall 22 when the pedestal 2 is at the removal position. Further, the top surface 53a of the front stopper 53 between the left and right front stoppers 53 is capable of contacting on the lower edge 23b of the front wall 23 of the pedestal 2.

As shown in FIG. 9 or FIG. 10, a spring 29 is provided to the stand device 1 for keeping the pedestal 2 at the support position. The spring 29 urges the pedestal 2 in the direction from the removal position to the support position (the counterclockwise direction in FIG. 9). Therefore, when no external force is applied from the electronic device 100 or the like, the pedestal 2 is pressed onto the rear stopper 52 by the elastic force of the spring 29 to be thereby kept at the support position. In this example, a torsion spring serves as the spring 29. The spring 29 has one end inserted into a fixing portion 21a formed on the lower surface of the support surface portion 21 and the other end contacting on the base plate 5. Further, a support shaft 28a is formed on the pedestal 2 that extends in the direction of the rotation axis C1 of the pedestal 2. The spring 29 is wound around the support shaft 28a.

As shown in FIG. 3 or FIG. 8, the stand device 1 has the connector 71 described above and a circuit board 72 on which the connector 71 is mounted. In this example, the connector 71 and the circuit board 72 are mounted so as to turn together with the pedestal 2 around the pivot 22a. In detail, the pedestal 2 has a substrate accommodation space 28. The substrate accommodation space 28 is positioned on the lower side of the support surface portion 21, and the circuit board 72 is held in the substrate accommodation space 28. In this regard, the stand device 1 includes a circuit board (not shown) placed on the base plate 5. The circuit board 72 is connected to the circuit board on the base plate 5 through a flexible cable, such as, e.g., an FFC.

The circuit board 72 is placed in the substrate accommodation space 28 in parallel to the support surface portion 21. The connector 71 is mounted perpendicular to the circuit board 72. Further, the connector 71 is placed perpendicular to the support surface portion 21 and projects upward through the opening 21b formed on the support surface portion 21. Therefore, the insertion direction of the connector 71 is perpendicular to the support surface portion 21. Further, as shown in FIG. 8, when the pedestal 2 is arranged at the support position, the connector 71 is inclined rearward. As described above, the pedestal 2 is put into the removal position from the support position by turning such that the front side thereof descends. Therefore, the rearward inclination of the connector 71 at the time when the pedestal 2 is arranged at the removal position is smaller than the inclination of the connector 71 at the time when the pedestal 2 is arranged at the support position. In particular, in this example, when the pedestal 2 is arranged at the removal position, the connector 71 remains vertical. In this regard, the connector 71 and the circuit board 72 are supported so that the connector 71 inclines forward independently of the pedestal 2. A structure for supporting the connector 71 or the like will be described later.

The substrate accommodation space 28 includes paired inside walls 28b positioned on the lower side of the support surface portion 21 and face to each other in the left-right direction, and a lower cover 28c fixed to the lower side of the inside wall 28b. The lower cover 28c is fixed to the inside walls 28b, 28b with a bolt 79 for closing the substrate accommodation space 28 (see FIG. 8 or FIG. 10). The support shaft 28a for supporting the spring 29 is provided on the lateral surface of the inside wall 28b.

Figure 11:
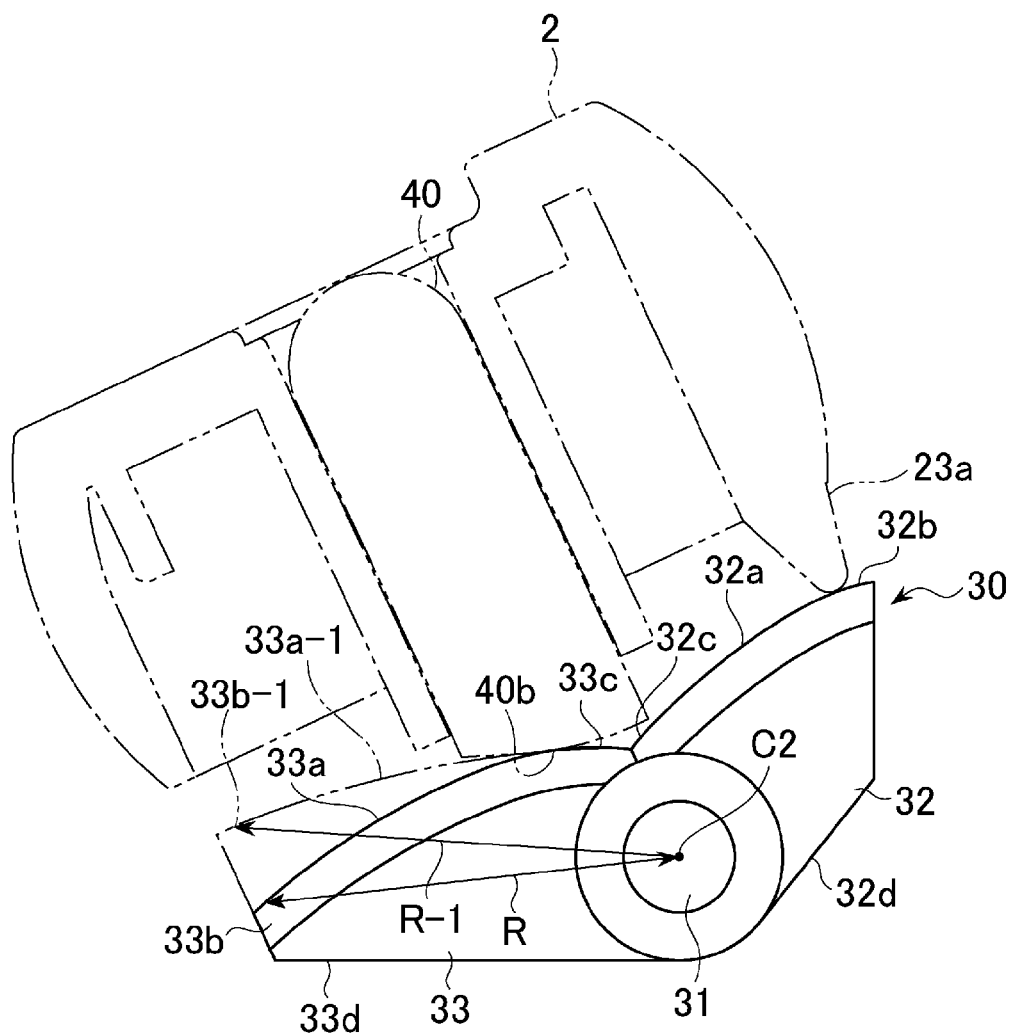
FIG. 11 is a side view of a lever of the lever mechanism, showing, together with the lever, the pedestal and a slider outlined by a long dashed double-short dashed line.

The lever mechanism 3 will be described in detail. As described above, the lever mechanism 3 includes the lever 30. FIG. 11 is a side view of the lever 30. In this regard, together with the lever 30, the pedestal 2 and the slider 40 are shown by a long dashed double-short dashed line in the diagram. As shown in FIG. 2, 4, or 11, the lever 30 includes a fulcrum portion 31, a pressed arm 32, and a support arm 33. The fulcrum portion 31 is rotatably supported, and the lever 30 is arranged such that the rotation axis C2 of the fulcrum portion 31 is in parallel to the rotation axis C1 of the pedestal 2. Further, the rotation axis C2 is positioned below and more forward than the rotation axis C1.

Paired lever support portions 54, 54 opposed to each other in the left-right direction is formed standing upright on the base plate 5. The lever 30 is arranged between the lever support portions 54, 54. The fulcrum portion 31 is formed into a pivot-like projection projecting in the left-right direction, and is rotatably supported by the paired lever support portions 54, 54. In detail, the lever support portion 54 has, on the upper edge thereof, a concave corresponding to the outside diameter of the fulcrum portion 31, and the fulcrum portion 31 is fit into the concave of the lever support portion 54 to be thereby supported.

The pressed arm 32 and the support arm 33 extend from the fulcrum portion 31 in the radial direction of the fulcrum portion 31 and are movable in the up-down direction around the fulcrum portion 31. The pressed arm 32 and the support arm 33 are positioned opposite each other in the front-back direction across the fulcrum portion 31. Therefore, up and down movement of the pressed arm 32 and that of the support arm 33 around the fulcrum portion 31 are in opposite directions from each other. That is, as shown in FIG. 4, the position of the support arm 33 in the front-back direction is more rearward than the fulcrum portion 31, and that of the pressed arm 32 is more forward than the fulcrum portion 31. Therefore, when the pressed arm 32 moves downward around the fulcrum portion 31, the support arm 33 moves upward. To the contrary, when the pressed arm 32 moves upward around the fulcrum portion 31, the support arm 33 moves downward.

The lever 30 can turn between the position thereof (hereinafter referred to as a non-lift position) shown in FIG. 4 and the position thereof (hereinafter referred to as a lift position) shown in FIG. 5. When the lever 30 is arranged at the non-lift position, the pressed arm 32 is placed extending diagonally upward relative to the base plate 5, and the support arm 33 remains along the base plate 5. Meanwhile, When the lever 30 is arranged at the lift position, the pressed arm 32 remains along the base plate 5, and the support arm 33 is placed extending diagonally upward relative to the base plate 5. In this regard, while moving from the non-lift position to the lift position, the lever 30 presses up the slider 40 as to be described later.

As shown in FIG. 2, the base plate 5 includes the front wall 55 in front of the lever mechanism 3 that extends in the left-right direction. A concave 55a is formed on the front wall 55 for avoiding interference between the front wall 55 and the pressed arm 32 when the lever 30 is placed at the lift position.

The pressed arm 32 is positioned below and contacting on the pressing portion 23a formed on the pedestal 2. Therefore, the lever 30 turns along with the movement of the pedestal 2. That is, when the pedestal 2 moves from the support position to the removal position, the pressed arm 32 is pressed by the pressing portion 23a to thus move downward. Then, the fulcrum portion 31 rotates along with the downward movement of the pressed arm 32, and the support arm 33 moves upward by the rotation of the fulcrum portion 31 caused by the movement of the pressed arm 32. In this manner, the lever 30 at the non-lift position moves to the lift position.

As shown in FIG. 11, the pressed arm 32 includes a slide surface 32a formed on the top surface thereof for contacting on the pressing portion 23a. The distal end 32b of the slide surface 32a is positioned apart from the fulcrum portion 31 in the radial direction. The slide surface 32a extends such that the distance to the rotation axis C2 of the fulcrum portion 31 becomes shorter as getting closer to the proximal end 32c. Therefore, the distance between the proximal end 32c and the rotation axis C2 is shorter, compared to the distance between the distal end 32b and the rotation axis C2.

As shown in FIG. 4 or FIG. 5, when the pedestal 2 is arranged at the support position, the pressing portion 23a contacts on the distal end 32b of the slide surface 32a, and the position of the proximal point 32c in the front-back direction is more rearward than the position of the pressing portion 23a. Further, the pressing portion 23a is arranged such that the position thereof in the front-back direction shifts rearward when the pedestal 2 turns from the support position to the removal position. In this example, when the pedestal 2 is arranged at the support position, the position of the pressing portion 23a is more forward and lower than the rotation axis C1. Therefore, when the pedestal 2 turns in a direction toward the removal position, the direction of shift of the position of the pressing portion 23a in the front-back direction is always rearward. Therefore, when the pedestal 2 moves from the support position to the removal position, the pressing portion 23a shifts on the slide surface 32a from the distal end 32b to the proximal end 32c.

In this example, when the pedestal 2 turns toward the removal position, that is, when the lever 30 turns toward the lift position, the position of the proximal point 32c in the front-back direction shifts forward. Therefore, when the pedestal 2 turns toward the removal position, the pressing portion 23a shifts on the slide surface 32a toward the proximal point 32c due to the forward movement of the proximal point 32c and the rearward movement of the pressing portion 23a.

The turn degree of the lever 30 relative to the downward movement distance of the pressing portion 23a is larger in a case when the pressing portion 23a presses a position on the slide surface 32a closer to the proximal end 32c, compared to a case when the pressing portion 23a presses a position on the slide surface 32a closer to the distal end 32b. Therefore, a structure in which the pressing portion 23a moves on the slide surface 32a toward the proximal end 32c, ensures a larger turn degree of the lever 30 relative to the downward movement distance of the pressing portion 23a, that is, the turn degree of the pedestal 2, compared to a structure where the pressing portion 23c keeps to press only on the proximal end 32c or on a closer position to the proximal end 32c.

Further, in this example, as shown in FIG. 11, the slide surface 32a is slightly curved such that it swells upward. Such a curvature of slide surface 32a enlarges the turn degree of the lever 30 in the first half of the movement process (from the support position to the removal position) of the pedestal 2.

FIG. 12 is a diagram explaining movement of the lever 30. FIG. 12(a-1) to FIG. 12(a-3) show the pedestal 2 and the lever 30. FIG. 12(b-1) to FIG. 12(b-3) show the pedestal 2 and a lever 30A. The lever 30A is a lever for comparison with the lever 30, in which the slide surface 32Aa of the pressed arm 32A of the lever 30A extends linearly from the distal end 32Ab to the proximal end 32Ac. FIG. 12(a-1) and FIG. 12(b-1) show the pedestal 2 at the support position. FIG. 12(a-3) and FIG. 12(b-3) show the pedestal 2 at the removal position. Further, FIG. 12(a-2) and FIG. 12(b-2) show the pedestal 2 between the support position and the removal position, in which the turn positions of the pedestal 2 in FIG. 12(a-2) and FIG. 12(b-2) are identical to each other. For clarification of a difference in movement between the lever 30 and the lever 30A, the curvature of the slide surface 32a of the lever 30 is shown exaggerated in FIG. 12(a-1) to FIG. 12(a-3).

As shown in FIG. 12(a-1) and FIG. 12(b-1), when the pedestal 2 is arranged at the support position, the position of the lever 30A is identical to that of the lever 30. Further, as shown in FIG. 12(a-3) and FIG. 12(b-3), when the pedestal 2 is arranged at the removal position as well, the position of the lever 30A is identical to that of the lever 30. An explanation about the above referring to an angle between the support arm 33 and the base plate 5 will be as follows. That is, when the pedestal 2 is arranged at the support position, the respective angles between the respective support arms 33, 33A and the base plate 5 are both 0 degree (the angle is referred, in these figures, as an angle between the rear surface 33d, 33Ad along the base plate 5 and the base plate 5). Meanwhile, when the pedestal 2 arranged at the removal position, the respective angles between the respective support arms 33, 33A and the base plate 5 are both θ3. However, as shown in FIG. 12(a-2) and FIG. 12(b-2), when the pedestal 2 is arranged between the support position and the removal position, the position of the lever 30 is closer to the removal position than the position of the lever 30A because the slide surface 32a of the pressed arm 32 is curved upward. Specifically, the turn degree of the lever 30 relative to that of the pedestal 2 is larger than the turn degree of the lever 30A. The following is an explanation about the above referring to the angle between the respective support arms 33, 33A and the base plate 5. While the angle between the support arm 33A and the base plate 5 is θ2A, the angle between the support arm 33 and the base plate 5 is θ2 (θ2>θ2A). That is, the turn degree of the lever 30 in the first half of the movement process of the pedestal 2 from the support position to the removal position is larger than that of the lever 30A. Accordingly, by changing the manner of curvature of the slide surface 32a as described above, it is possible to desirably adjust the turn speed of the lever 30. For example, By curving the slide surface 32a such that it swells upward, the turn speed of the lever 30 in the first half of the movement process is faster than that in a structure in which the slide surface 32a is not curved.

Further, the slider 40 to be pressed up by the support arm 33 to thus project from the support surface portion 21 is placed on the support arm 33, as to be described later. By changing the manner of curvature of the slide surface 32a, it is possible to desirably adjust the speed of the upward movement of the slider 40 and a time at which the slider 40 presses up the electronic device 100. In this example, by curving the slide surface 32a such that it swells upward the speed of the slider 40 in the first half of the moving process is faster than that of a structure in which the slide surface 32a is not curved.

The support arm 33 and the slider 40 will be described. As shown in FIG. 4, the slider 40 is a substantially rectangular parallelepiped member that is long in the up-down direction. The slider 40 is placed on the support arm 33, and includes, at the lower end thereof, a contact portion 40b contacting on the support arm 33. That is, the support arm 33 supports the slider 40 on the lower side of the slider 40. Therefore, a projection 40a at the upper end of the slider 40 moves up and down along with the rotation of the fulcrum portion 31, that is, an up-down movement of the support arm 33.

In detail, the slider 40 is movable between a storage position where the projection 40a is held inside the pedestal 2 (the position of the slider 40 shown in FIG. 4) and a projected position where the projection 40a is projected upward through the opening 21c formed on the support surface portion 21 (the position of the slider 40 shown in FIG. 5). When the fulcrum portion 31 rotates along with the downward movement of the pressed arm 32 and the support arm 33 thus moves upward, the slider 40 at the storage position is pressed up by the support arm 33, and the projection 40a projects upward from the support surface portion 21. That is, the projection 40a moves upward along with the rotation of the fulcrum portion 31 caused by the downward movement of the pressed arm 32, and projects from the support surface portion 21. With the projection 40a projecting from the support surface portion 21, the electronic device 100 placed on the support surface portion 21 is pressed upward.

In this example, the tip end of the projection 40a is rounded. This allows the electronic device 100 to be placed diagonal to the slider 40 when the projection 40a presses up the electronic device 100. When the slider 40 is arranged at the storage position, the tip end of the projection 40a remains at the substantially same height as the support surface portion 21.

As shown in FIG. 4, 5, or 10, a guide portion 27 is formed in the pedestal 2. The guide portion 27 guides a moving direction of the slider 40. That is, the guide portion 27 guides the slider 40 to move between the storage position and the projected position. In this example, the guide portion 27 is formed into a wall shape extending downward from an edge of the opening 21c formed on the support surface portion 21 and surrounding the lateral surface of the slider 40. Therefore, the slider 40 can move up and down along the guide portion 27. Further, the slider 40 is positioned on the rotation axis C1 of the pedestal 2, and turns together with the pedestal 2 around the rotation axis C1 when the pedestal 2 turns.

The guide portion 27 extends downward perpendicular to the support surface portion 21. Therefore, the guide portion 27 guides the slider 40 to move perpendicular to the support surface portion 21. Further, as described above, the connector 71 projects upward from the support surface portion 21, and is formed perpendicular to the support surface portion 21. Therefore, the guide portion 27 guides the slider 40 to move in the projection direction of the connector 71, that is, the insertion direction of the connector 71.

In this regard, the stand device 1 includes two sliders 40 arranged apart from each other in the left-right direction. Further, the connector 71 is positioned between the two sliders 40. In particular, in this example, when the sliders 40 move, the connector 71 is positioned on the straight line connecting the projections 40a of the two sliders 40. Therefore, in removing the electronic device 100, the sliders 40 press up the electronic device 100 at two positions on the both sides of the connector 71. With this arrangement, in removing the electronic device 100, the connector 71 can be smoothly separated from the connector of the electronic device 100.

Further, the support surface portion 21 is provided with a protrusion 74. The protrusion 74 protrudes upward from the support surface portion 21 to be inserted into a hole formed on the lower surface of the electronic device 100. The protrusion 74 guides the electronic device 100 to an appropriate position on the support surface portion 21. The guide portion 27 guides the slider 40 to move in the protrusion direction of the protrusion 74.

As shown in FIG. 11, the support arm 33 includes a slide surface 33a on the top surface thereof, and the slide surface 33a contacts on the contact portion 40b of the slider 40. The distal end 33b of the slide surface 33a is positioned apart from the fulcrum portion 31 in the radial direction of the fulcrum portion 31. The slide surface 33a extends such that the distance from that to the rotation axis C2 of the fulcrum portion 31 becomes shorter toward the proximal end 33c of the slide surface 33a. Therefore, the distance between the proximal end 33c and the rotation axis C2 is shorter than the distance between the distal end 33b and the rotation axis C2.

The guide portion 27 supports the slider 40 such that the contact portion 40b moves on the slide surface 33a toward the distal end 33b when the support arm 33 moves upward around the fulcrum portion 31. In detail, when the pedestal 2 is arranged at the support position, the guide portion 27 supports the slider 40 on a slant, and the position of the contact portion 40b is more forward and lower than the rotation axis C1. Therefore, when the pedestal 2 turns toward the removal position, the position of the contact portion 40b in the front-back direction shifts rearward. Further, because the support arm 33 extends rearward from the fulcrum portion 31, the distal end 33b of the slide surface 33a is positioned more rearward than the contact portion 40b when the pedestal 2 is arranged at the support position. As a result, when the pedestal 2 moves toward the removal position, that is, when the support arm 33 moves upward around the fulcrum portion 31, the contact portion 40b shifts on the slide surface 33a toward the distal end 33b. In this example, when the pedestal 2 is arranged at the support position, the contact portion 40b is positioned closer to the proximal end 33c of the slide surface 33a. Therefore, the contact portion 40b moves on the slide surface 33a from a position closer to the proximal end 33c toward the distal end 33b.

A structure in which the contact portion 40b moves on the slide surface 33a toward the distal end 33b enlarges an upward movement distance for the slider 40, compared to a structure in which the contact portion 40b remains at a position closer to the proximal end 33c. That is, the movement distance of the sliding member 40 relative to the turn degree of the lever 30 is longer in a structure in which the support arm 33 presses up the slider 40 at its position closer to the distal end 33b, compared to a structure in which the support arm 33 presses up the slider 40 at its position closer to the proximal end 33c. Therefore, with the structure in which the contact portion 40b moves as described above, a longer upward movement distance can be ensured for the slider 40, compared to a structure in which the support arm 33 keeps to press up the contact portion 40b only at a position closer to the proximal end 33c.

Further, in this example, as shown in FIG. 11, the slide surface 33a is slightly curved such that it swells upward. Such a curvature of the slide surface 33a enlarges the movement distance of the slider 40 in the first half of the turn process of the pedestal 2, that is, in the first half of the turn process of the lever 30.

Figure 13:
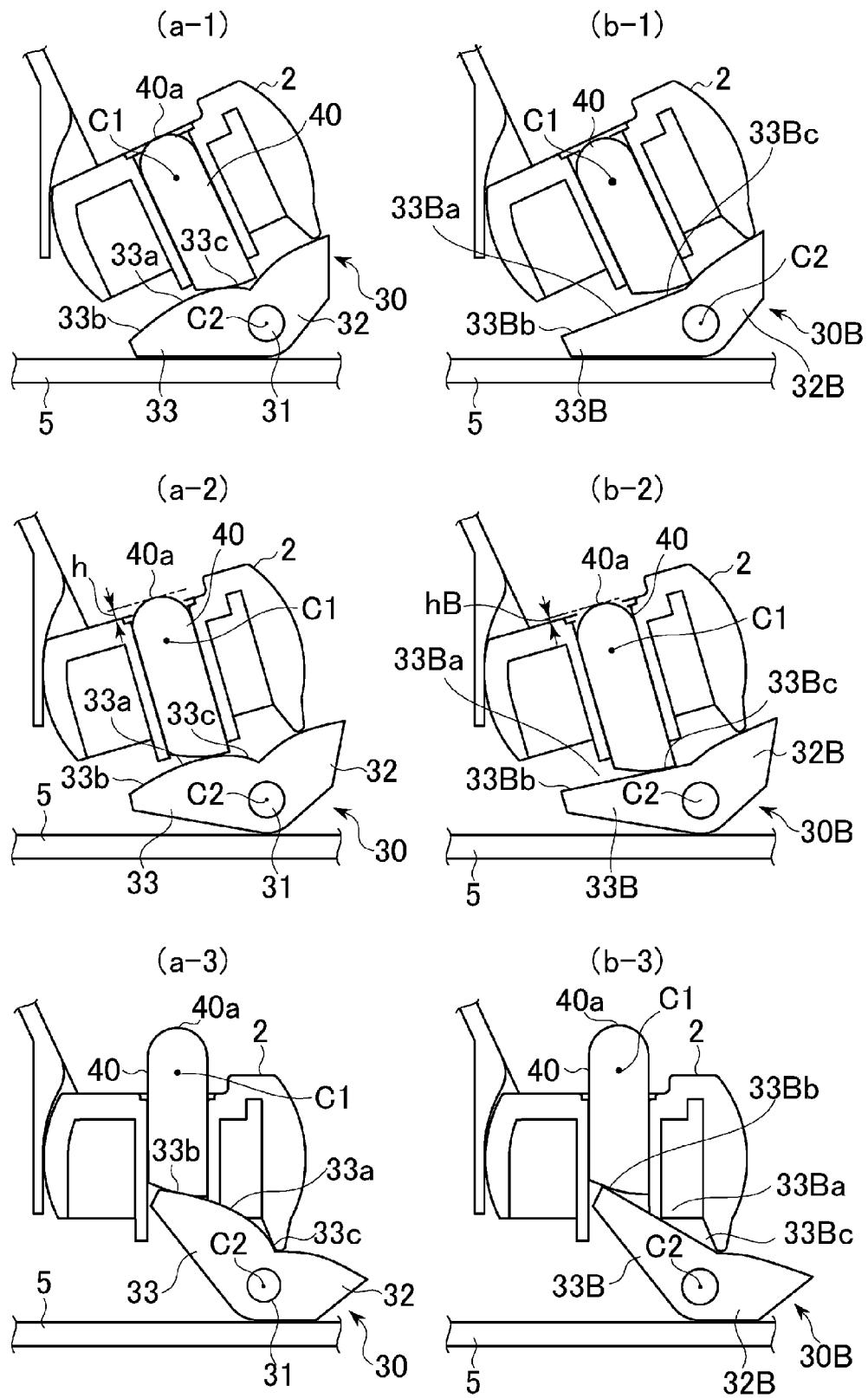
FIG. 13 is a diagram for explaining movement of the slider and the lever, in which FIG. 13(a-1) to FIG. 13(a-3) show the lever and the slider and FIG. 13(b-1) to FIG. 13(b-3) show a lever for comparison and the slider.

FIG. 13 is a diagram explaining movement of the slider 40 and the lever 30. FIG. 13(a-1) to FIG. 13(a-3) show the lever 30 and the slider 40, and FIG. 13(b-1) to FIG. 13(b-3) show a lever 30B and the slider 40. The lever 30B is a lever for comparison with the lever 30, in which the slide surface 33Ba of the support arm 33B of the lever 30B extends linearly from the distal end 33Bb to the proximal end 33Bc. Further, FIG. 13(a-1) and FIG. 13(b-1) show the levers 30, 30B, respectively, at the non-lift position, and FIG. 13(a-3) and FIG. 13(b-3) show the levers 30, 30B, respectively, at the lift position. Further, FIG. 13(a-2) and FIG. 13(b-2) show the levers 30, 30B, respectively, between the non-lift position and the lift position. Note that the turn positions of the pedestal 2 and the levers 30, 30B shown in FIG. 13(a-2) and FIG. 13(b-2) are identical to each other.

As shown in FIG. 13(a-1) and FIG. 13(b-1), when the lever 30, 30B is arranged at the non-lift position, the position of the slider 40 on the lever 30 is identical to that of the slider 40 on the lever 30B. That is, when the lever 30, 30B is arranged at the non-lift position, the height of the projection 40a is equal to that of the support surface portion 21. Similarly, when the lever 30, 30B is arranged at the lift position, as shown in FIG. 13(a-3) and FIG. 13(b-3), the position of the slider 40 on the lever 30 is identical to that of the slider 40 on the lever 30B. However, as shown in FIG. 13(a-2) and FIG. 13(b-2), when the lever 30, 30B is arranged between the non-lift position and the removal position, the position of the slider 40 on the lever 30 is higher than that of the slider 40 on the lever 30B because the slide surface 33a of the support arm 33 is curved upward. An explanation about the above referring to the height of the projection 40a relative to the support surface portion 21 will be as follows. That is, the height of the projection 40a of the slider 40 on the lever 30B is defined as hB, while that of the projection 40a of the slider 40 on the lever 30 is defined as h (h>hB). That is, with the slide surface 33a curved upward, the speed of the slider 40 in the first half of the moving process of the lever 30 results in faster, compared to that in a case in which the slide surface 33a is not curved as such, and the movement distance of the slider 40 in the first half of the moving process of the lever 30 results in longer. By changing the manner of curvature of the slide surface 33a, it is possible to desirably adjust the moving speed of the slider 40 and a time at which the projection 40a begins pressing up the electronic device 100.

Further, by changing the distance from the rotation axis C2 to the distal end 33b of the slide surface 33a, it is possible to change the projected amount of the projection 40a. For example, the distance R1 between the distal end 33b-1 of the slide surface 33a-1 indicated by a two-dot chain line in FIG. 11, and the rotation axis C2 is longer than the distance R between the distal end 33b and the rotation axis C2. Changing the shape of the lever 30 in this manner makes the position of the distal end 33b higher in height from the base plate 5 and thus increases the projected amount of the projection 40a when the lever 30 is arranged at the lift position.

In this regard, as shown in FIG. 11, the pressed arm 32 includes a rear surface 32d on the side opposite from the slide surface 32a. Further, the support arm 33 includes a rear surface 33d on the side opposite from the slide surface 33a. When the lever 30 is arranged at the lift position, the rear surface 32d remains along the base plate 5, while the rear surface 33d is placed diagonal relative to the base plate 5 (see FIG. 5). Meanwhile, when the lever 30 is arranged at the non-lift position, the rear surface 32d is placed diagonal relative to the base plate 5, while the rear surface 33d remains along the base plate 5 (see FIG. 4). In this example, the pressed arm 32 and the support arm 33 are arranged such that the angle between the rear surface 32d and the rear surface 33d is an obtuse angle. With this arrangement, when the rear surface 32d is positioned lowest, that is, when the rear surface 32 remains along the base plate 5, the distal end 33b of the support arm 33 is positioned highest. Alternatively, the pressed arm 32 and the support arm 33 may be arranged such that the angle between the rear surface 32d and the rear surface 33d is an acute angle. In this structure, a stopper may be provided for restricting the turn of the lever 30 such that the support arm 33 stops at an appropriate position (e.g., a position with the distal end 33b at highest) when the lever 30 turns toward the lift position.

As shown in FIG. 6 or FIG. 7, the stand device 1 includes a spring 49 for urging the slider 40 in the direction from the projected position to the storage position. The slider 40 has a receiving portion 42 that is open upward. The spring 49 is arranged between the receiving portion 42 and the support surface portion 21, and the receiving portion 42 supports the spring 49 on the lower side thereof. When the lever 30 turns from the non-lift position to the lift position, the support arm 33 presses up the slider 40 against the elastic force of the spring 49. Therefore, when the slider 40 is arranged at the projected position, a force for pressing down the slider 40 (the direction from the projected position to the storage position) is applied to the slider 40.

Operation of the pedestal 2 and the lever mechanism 3 will be described. When the pedestal 2 moves from the support position to the removal position, the pressing portion 23*a* presses down the pressed arm 32 of the lever 30. With the above, the lever 30 turns from the non-lift position to the lift position around the fulcrum portion 31. In this process, the pressing portion 23*a* moves on the slide surface 32*a* of the pressed arm 32 toward the proximal end 32*c*. As the lever 30 turns, the support arm 33 presses up the slider 40 placed thereon. As a result, the projection 40*a* presses up the electronic device 100 placed on the support surface portion 21 and moves to a position higher than the support surface portion 21. In this process, the contact portion 40*b* of the slider 40 shifts on the slide surface 33*a* of the support arm 33 toward the distal end 33*b*. When the electronic device 100 is removed from the stand device 1, the spring 49 presses down the slider 40. As a result, the lever 30 turns from the lift position to the non-lift position, and the pressed arm 32 presses up the pressing portion 23*a*. Then, the pedestal 2 turns from the removal position to the support position.

Figure 14:
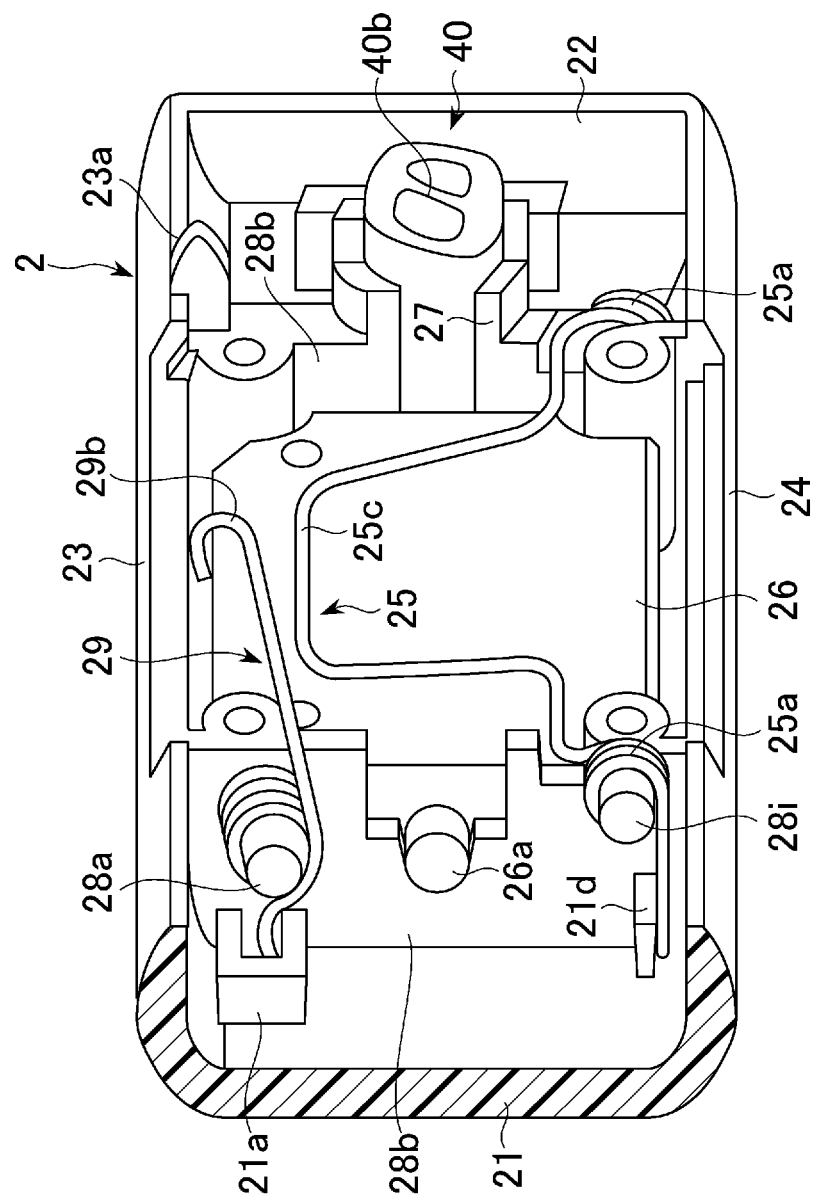
FIG. 14 is a perspective view of the pedestal viewed from diagonally below thereof. In this figure, a lower cover for closing a substrate accommodation space from below thereof removed.
Figure 15:
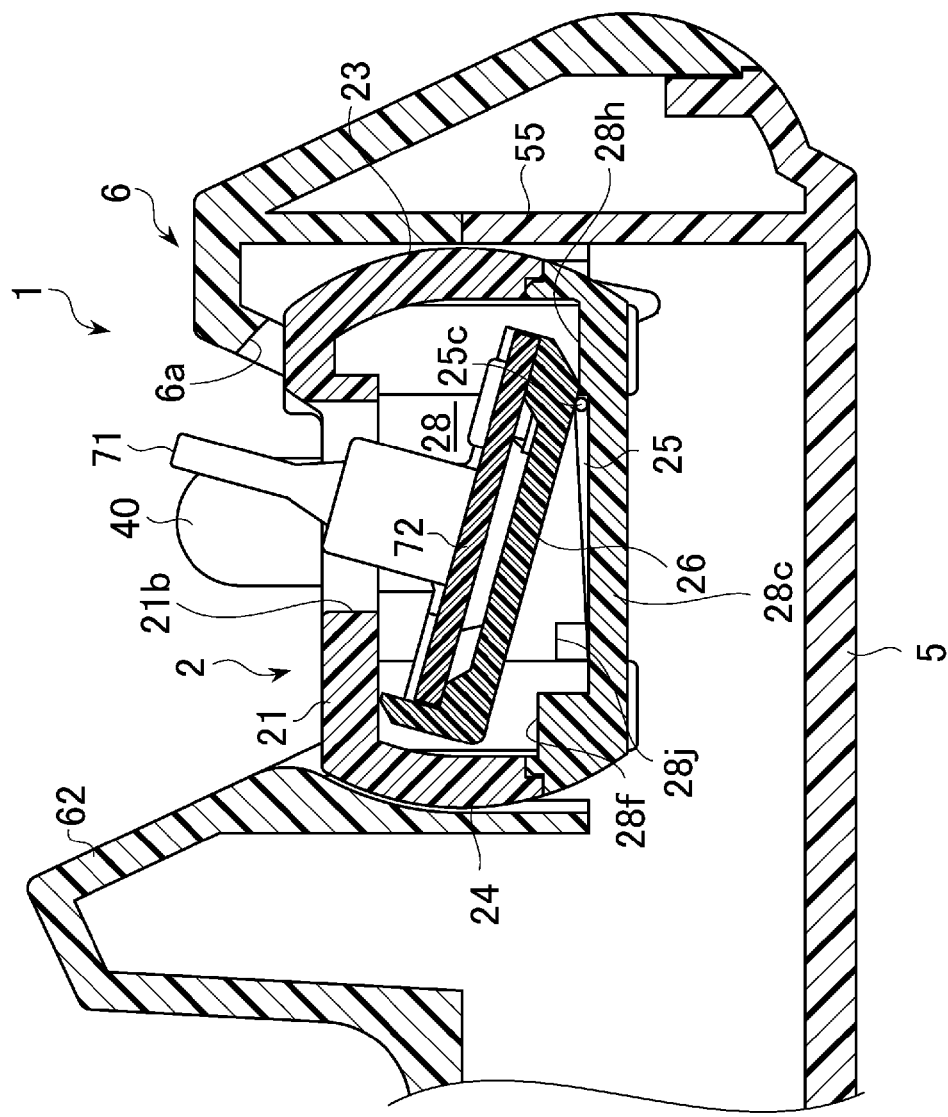
FIG. 15 is a cross sectional view obtained by cutting the stand device along a cross section same as that in FIG. 8, in which the pedestal is placed at the removal position with the connector inclined forward.

A structure for supporting the connector 71 and the circuit board 72 in the substrate accommodation space 28 will be described. FIG. 14 is a perspective view of the pedestal 2 viewed from diagonally below thereof, in this figure, the lower cover 28*c* for closing the substrate accommodation space 28 is removed. FIG. 15 is a cross sectional view obtained by cutting the stand device 1 along the cross section same as that in FIG. 8. As described above, the connector 71 and the circuit board 72 are supported capable of inclining forward. FIG. 15 shows the pedestal 2 at the removal position, and the connector 71 inclined forward.

The circuit board 72 is held in the substrate accommodation space 28 such that the position of the front side thereof is capable of up-down movement. In detail, a receiving base 26 on which the circuit board 72 is mounted is arranged in the substrate accommodation space 28. The circuit board 72 is fixedly mounted on the receiving base 26. As shown in FIG. 3, 9, or 14, pivots 26*a*, 26*a* are formed to the receiving base 26 that projects in the direction of the rotation axis C1 and is rotatably supported by the inside wall 28*b* and the lower cover 28*c*. In this example, a concave 28*d* is formed on the lower edge of the inside wall 28*b*, and the pivot 26*a* is placed in the concave 28*d*. Further, as shown in FIG. 9 or 10, a lateral wall 28*e* is formed standing upright on the edge of the lower cover 28*c*. The pivot 26*a* is rotatably supported by the upper edge of the lateral wall 28*e* and the concave 28*d*.

Then, because the receiving base 26 turns around the pivot 26*a*, the circuit board 72 can incline relative to the support surface portion 21. That is, the receiving base 26 and the circuit board 72 are supported movable between a position where the receiving base 26 and the circuit board 72 are placed in parallel to the support surface portion 21 (the position is hereinafter referred to as a horizontal position (the position of the circuit board 72 and the receiving base 26 shown in FIG. 8)) and a position where the front side of the circuit board 72 is positioned lower than the rear side (the position is hereinafter referred to as an inclined position (the position of the circuit board 72 and the receiving base 26 shown in FIG. 15)). As a result, the connector 71 is movable between a position where the connector 71 is placed perpendicular to the support surface portion 21 and a position where the connector 71 is placed inclined forward relative to the surface 21.

As described above, the pedestal 2 turns around the pivot 22*a* such that the front side of the pedestal 2 descends to be thereby put into the removal position. Further, after the pedestal 2 is arranged at the removal position, the connector 71 can incline forward, independent of the pedestal 2. This allows a user of the stand device 1 to lift the electronic device 100 diagonally forward to remove the electronic device 100 from the stand device 1, which can improve workability in removing. For example, in a case where a stand device is placed in a place, such as in a storage rack, where a sufficient vertical space can be hardly ensured, it is not easy to lift the electronic device directly up from the stand device. According to the stand device 1, the connector 71 is supported so as to incline forward, which can improve workability in removing in such a narrow space.

As shown in FIG. 8, a rear stopper 28*f* is formed on the lower cover 28*c* for contacting on the lower surface of the rear side of the receiving base 26 arranged at the horizontal position. The rear stopper 28*f* restricts a movement of the receiving base 26 and the circuit board 72 beyond the horizontal position. That is, when the receiving base 26 and the circuit board 72 move from the inclined position to the horizontal position, the rear stopper 28*f* restricts a movement of the receiving base 26 and the circuit board 72 beyond the horizontal position. Further, as shown in FIG. 15, a front stopper 28*h* is formed on the lower cover 28*c* for contacting on the lower surface of the front side of the receiving base 26 at the inclined position. The front stopper 28*h* restricts a movement of the receiving base 26 beyond the inclined position. That is, when the receiving base 26 and the circuit board 72 move from the horizontal position to the inclined position, the rear stopper 28*f* restricts a movement of the receiving base 26 and the circuit board 72 beyond the inclined position.

As shown in FIG. 8 or 15, the stand device 1 includes a spring 25 for keeping the receiving base 26 and the circuit board 72 at the horizontal position. The spring 25 urges the receiving base 26 in the direction from the inclined position to the horizontal position (the counterclockwise direction in FIG. 8 or 15). Therefore, without a force applied from the electronic device 100 or the like through the connector 71, the receiving base 26 is pressed onto the rear stopper 28*f* with the elastic force of the spring 25, and thereby kept at the horizontal position.

In this example, a torsion spring having a coil 25*a* in two positions serves as the spring 25. The coil 25*a* is wound around the support shaft 28*i* projecting from the inside wall 28*b* in the left-right direction. The end portion 25*b* of the spring 25 is inserted into the fixing portion 21*d* formed on the lower surface of the support surface portion 21. A midway portion 25*c* of the spring 25 contacts on the lower surface of the front side of the receiving base 26. The spring 25 penetrates a concave 28*j* formed on the inside wall 28*b* to extend into inside the substrate accommodation space 28.

According to the stand device 1 described above, the pedestal 2 is supported movable between the support position for supporting the electronic device 100 placed on the support surface portion 21 and the removal position at which the pedestal 2 is arranged through a movement thereof in which the pressing portion 23*a* descends. Further, the lever mechanism 3 includes the pressed arm 32, the fulcrum portion 31, and the projection 40*a*. The pressed arm 32 is placed below the pressing portion 23*a*, and moves downward by being pressed by the pressing portion 23*a* when the pedestal 2 moves from the support position to the removal position. The fulcrum portion 31 is rotatably supported, and rotates along with the downward movement of the pressed arm 32. The projection 40*a* is movable up and down along with the rotation of the fulcrum portion 31, and moves upward along with the rotation of the fulcrum portion 31 caused by the downward movement of the pressed arm 32 to project from the support surface portion 21. According to the stand device 1 as described above, in removing the electronic device 100 from the stand device 1, the electronic device 100 is pressed up by the projection 40a. Therefore, even when the connector 71 remains rigidly inserted into the connector of the electronic device 100, the connectors can be readily separated from each other, which can improve workability in removing.

Note that the present invention is not limited to the stand device 1 described above, and various modifications are possible. For example, according to the stand device 1 described above, the lever mechanism 3 includes the lever 30 and the slider 40, and the projection 40a to project from the support surface portion 21 is provided to the slider 40. Alternatively, the projection may be provided to the lever instead.

FIG. 16 is a cross sectional view of a stand device 101 having such a structure. FIG. 16(a) shows the stand device 101 with the pedestal 2 at the support position, and FIG. 16(b) shows the stand device 101 with the pedestal 2 at the removal position. In these diagrams, a member identical to that described above is given an identical reference numeral, and an explanation thereof is not repeated.

As shown in the diagram, the stand device 101 includes a lever 130 as a lever mechanism. Similar to the lever 30, the lever 130 includes a pressed arm 132 and a fulcrum portion 131. Further, the lever 130 includes a pressing arm 133, which has a projection 133a formed at the tip end thereof. The pressing arm 133 and the pressed arm 132 are positioned opposite each other across the fulcrum portion 131, and the pressing arm 133 moves in the direction opposite from the pressed arm 132 around the fulcrum portion 131.

As shown in FIG. 16(a), when the pedestal 2 is arranged at the support position, the projection 133a is held inside the pedestal 2. When the pedestal 2 moves from the support position to the removal position, the pressed arm 132 is pressed by the pressing portion 23a to thus move downward. In this process, as shown in FIG. 16(b), the fulcrum portion 131 turns along with the downward movement of the pressed arm 132, and the pressing arm 133 moves upward around the fulcrum portion 131. As a result, when the pedestal 2 is arranged at the removal position, the projection 133a at the tip end of the pressing arm 133 projects upward from the support surface portion 21. The above is a description on the stand device 101.

Further, according to the stand device 1 described above, the pedestal 2 moves from the support position such that the front side thereof descends and the rear side ascends, to be thereby put into the removal position. However, movement of the pedestal 2 is not limited to the described above. For example, the pedestal 2 may move such that the front side alone descends while the rear side thereof is kept substantially unchanged in height, to be thereby put into the removal position. In this structure, the pivot 22a for supporting the pedestal 2 is formed, e.g., on the rear side of the lateral wall 22.

Note that the directions indicated in the above explain are relative directions for describing positional relationship between respective members and portions of the stand device 1. Therefore, in order to interrupt a positional relationship between respective members and portions, using as a reference the surface where the stand device 1 is mounted, the directions indicated in the above explain should be changed in interpretation according to the orientation of the surface.

The invention claimed is:

1. A stand device for a portable electronic device, comprising:
   a housing;
   a pedestal having a support surface for receiving and mounting the portable electronic device; and
   a lever mechanism arranged below the pedestal, wherein:
   the pedestal is rotationally moveable relative to the housing between a first position for supporting the electronic device mounted on the support surface and a second position for releasing the electronic device, the pedestal includes a pressing portion for engaging and rotating the lever mechanism as the pedestal moves from the first position to the second position and the pressing portion descends, and
   the lever mechanism includes
   a lever having: (i) a fulcrum portion about which the lever rotates, and (ii) a pressed portion positioned below and being engaged by the pressing portion such that the lever rotates about the fulcrum portion when the pedestal moves from the first position to the second position,
   a projection being engaged by the lever such that the projection moves axially from a retracted position within the pedestal to an extended position out of the pedestal in response to the rotation of the lever about the fulcrum portion caused by the pressed portion.

2. The stand device according to claim 1, wherein:
   the pressing portion is provided on a front side of the pedestal, and
   the pedestal moves from the first position such that the front side thereof descends, causing the pressing portion to engage the pressed portion, to thereby put the pedestal into the second position.

3. The stand device according to claim 2, further comprising a connector projecting upward from the support surface and supported so as to incline forward.

4. The stand device according to claim 1, wherein:
   the lever mechanism includes a slider movable up and down and including the projection at an upper portion thereof, and
   the lever includes a support portion for supporting the slider on a lower side of the slider and moving upward along with the rotation of the fulcrum portion to thereby press up the slider, and
   the stand device further includes a guide portion for guiding a moving direction of the slider.

5. The stand device according to claim 4, wherein the pedestal includes the guide portion.

6. The stand device according to claim 5, wherein:
   the pedestal includes a connector projecting from the support surface, and
   the guide portion guides the slider to move in a direction in which the connector projects.

7. The stand device according to claim 4, wherein:
   the support portion extends in a radial direction of the fulcrum portion,
   the slider includes an contact portion for contacting the support portion, and
   the guide portion supports the slider such that the contact portion moves on the support portion toward a distal end of the support portion while the support portion moves upward around the fulcrum portion.

* * * * *